US009198145B2

(12) United States Patent
Nakata

(10) Patent No.: US 9,198,145 B2
(45) Date of Patent: Nov. 24, 2015

(54) WIRELESS COMMUNICATION SYSTEM

(71) Applicant: DENSO CORPORATION, Kariya, Aichi-pref. (JP)

(72) Inventor: Tsuneo Nakata, Kariya (JP)

(73) Assignee: DENSO CORPORATION, Kariya (JP)

( * ) Notice: Subject to any disclaimer, the term of this patent is extended or adjusted under 35 U.S.C. 154(b) by 104 days.

(21) Appl. No.: 14/020,051

(22) Filed: Sep. 6, 2013

(65) Prior Publication Data

US 2014/0078960 A1  Mar. 20, 2014

(30) Foreign Application Priority Data

Sep. 14, 2012  (JP) ................................. 2012-202794

(51) Int. Cl.
*H04W 56/00* (2009.01)
(52) U.S. Cl.
CPC .................................. *H04W 56/001* (2013.01)
(58) Field of Classification Search
None
See application file for complete search history.

(56) References Cited

U.S. PATENT DOCUMENTS

2006/0245440 A1  11/2006  Mizukoshi
2010/0260165 A1  10/2010  Amagai

FOREIGN PATENT DOCUMENTS

JP  2009-164736 A  7/2009
JP  4763334 B2  8/2011

OTHER PUBLICATIONS

"Analysis of Timing Synchronization Process and Its Bottleneck in Multi-Hop Ad Hoc Networks Using IEEE 802.11 MAC Protocol" by H. Tanaka et al.: IEICE Transactions A, vol. J90-A, No. 3; 2007; pp. 228-239 (w/partial English translation).
Office Action mailed on Sep. 16, 2014 in corresponding JP application No. 2012-202794 (with English translation).

*Primary Examiner* — Chirag Shah
*Assistant Examiner* — Suk Jin Kang
(74) *Attorney, Agent, or Firm* — Posz Law Group, PLC

(57) ABSTRACT

In a wireless communication system, a first wireless communication unit receives a first data including identification information associated with the first data transmitted from a third wireless communication unit; generates, when needed to share a specific time with a second wireless communication unit, a second data associated with a first reception time of the received first data; and transmits the second data and the identification information of the received first data. The second wireless communication unit calculates, upon reception of the identification information and the second data, if it is judged that the first data has previously been received based on the identification information, a time value needed to synchronize with the first wireless communication unit, based on a second reception time of the first data previously received and the first reception time of the first data associated with the second data transmitted from the first wireless communication unit.

16 Claims, 17 Drawing Sheets

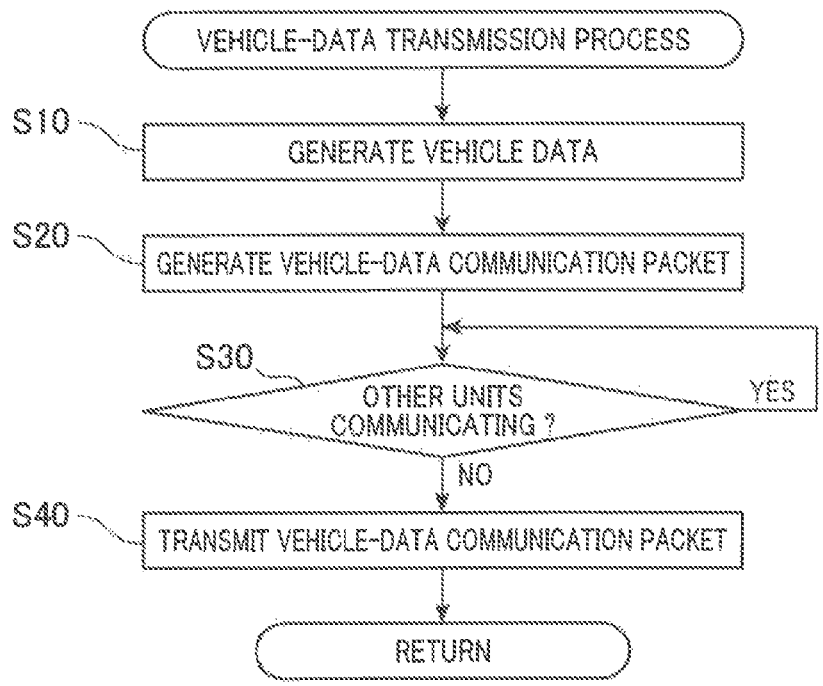
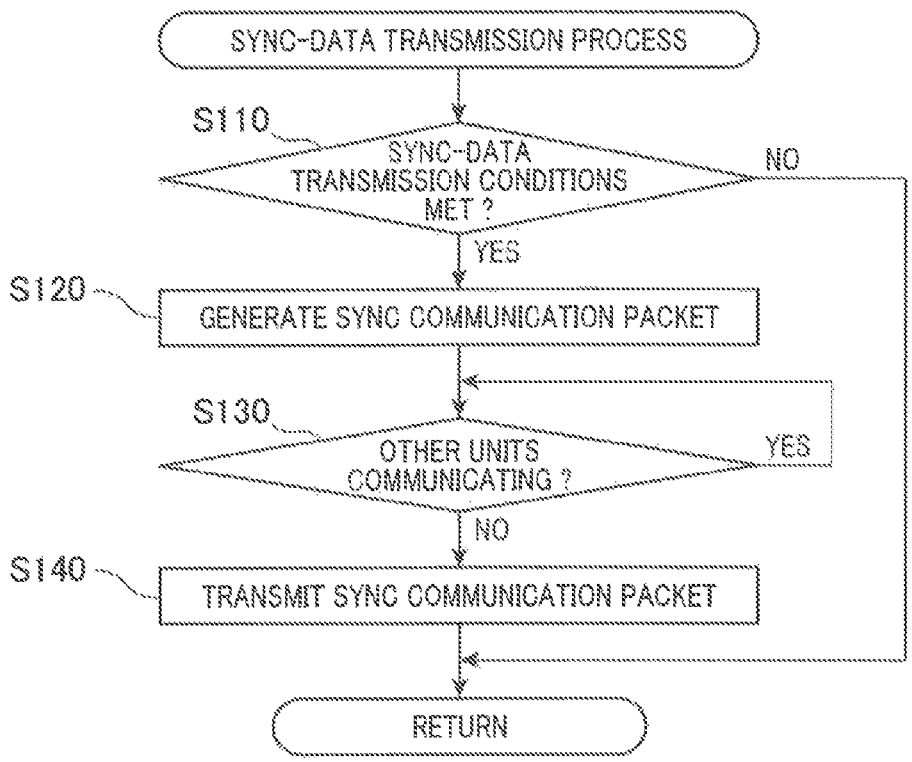

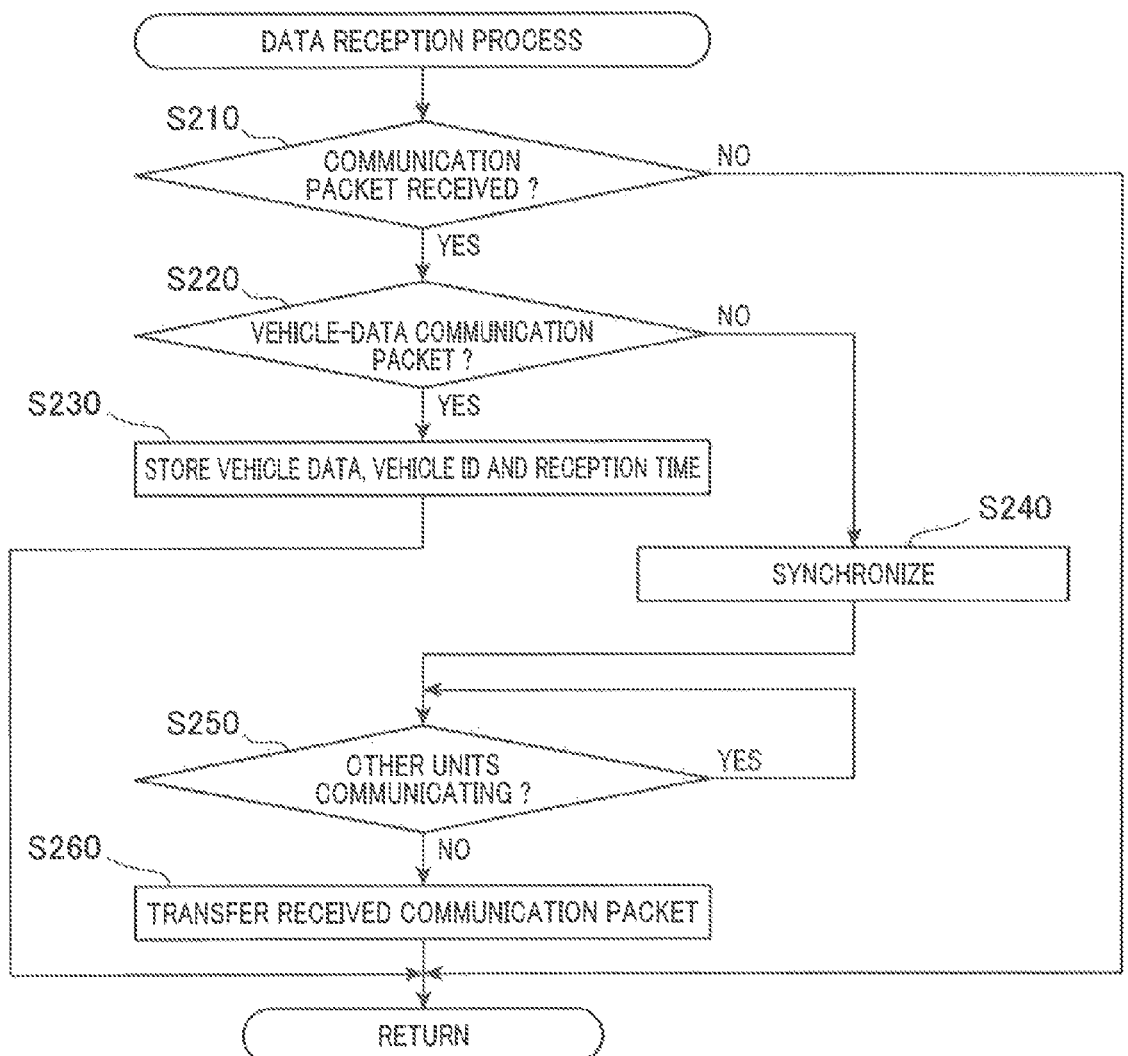

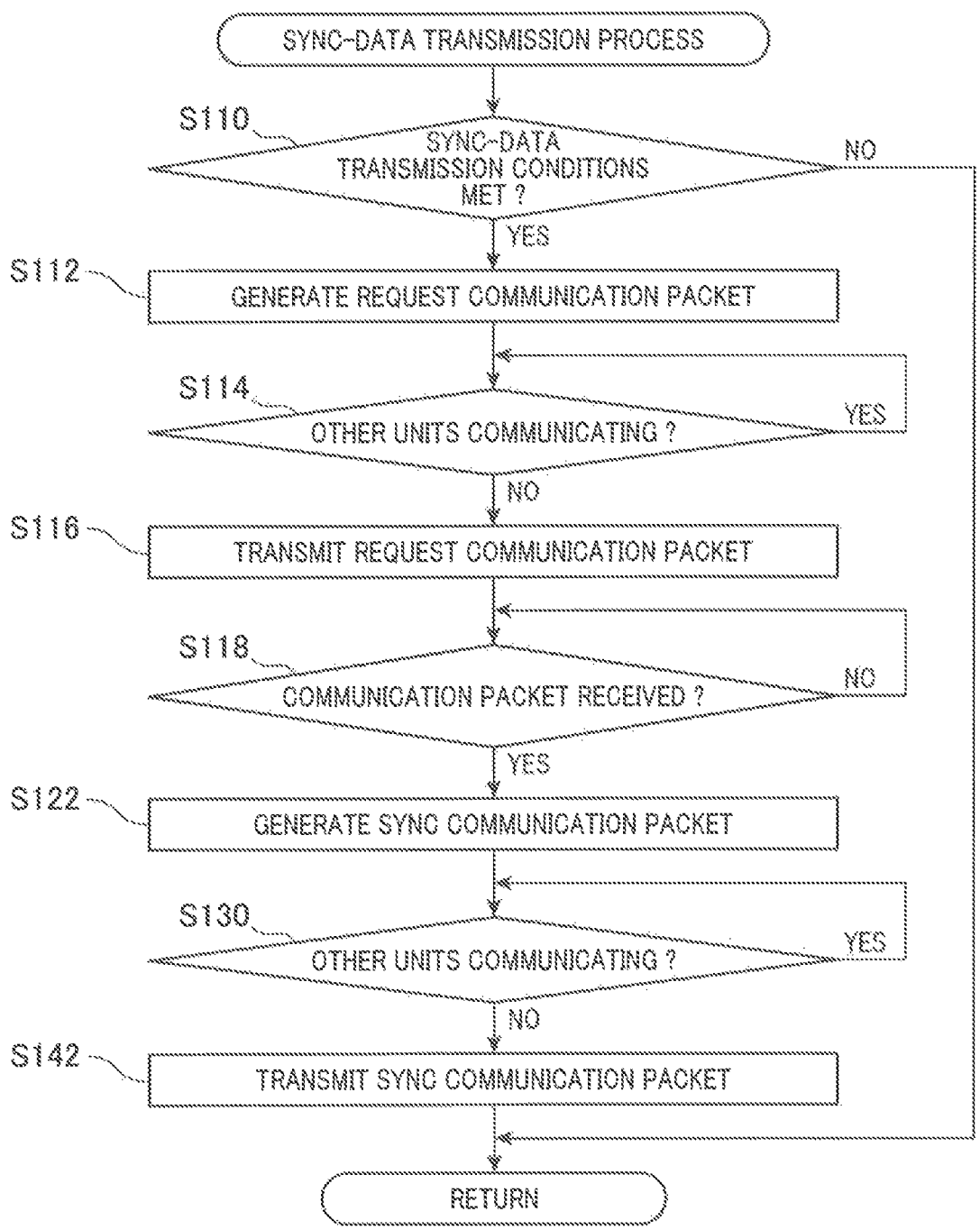

WIRELESS COMMUNICATION SYSTEM

CROSS-REFERENCE TO RELATED APPLICATION

This application is based on and claims the benefit of priority from earlier Japanese Patent Application No. 2012-202794 filed Sep. 14, 2012, the description of which is incorporated herein by reference.

BACKGROUND

1. Technical Field

The present invention relates to a wireless communication system in which data is wirelessly transmitted and received.

2. Related Art

In related art, such a technique that can establish synchronization between first and second networks is known. The first and second networks each is configured by a plurality of mobile wireless communication units that perform wireless communication (see, for example, patent document JP-B-4763334). In the technique, a synchronization device, which transmits synchronous signals, is set up in advance at a position from which synchronous signals can reach both of the first and second networks.

JP-B-4763334 discloses a wireless ad-hoc communication system in which a plurality of terminals mutually transmit and receive a first beacon so that these terminals can be synchronized. The wireless ad-hoc communication system has a first network to which a first group of terminals of the terminals belongs, and a second network to which a second group of terminals of the terminals belongs. At least one synchronization terminal is arranged in advance in a region where the terminals can be mobile. The synchronization terminal is able to receive the first beacon, while also being able to transmit a second beacon generated by itself to the terminals.

When the terminals belonging to the first and second groups reside in a range to which the second beacon transmitted by the synchronization terminal can reach, one synchronized network is formed, which includes the first and second networks and the synchronization terminal. Thus, a plurality of wireless ad-hoc communication networks that cannot directly transmit and receive a beacon can be synchronized with the intervention of the synchronization terminal.

However, with the technique described in JP-B-4763334, a synchronization terminal is required to be set up in advance and the range in which synchronization can be established is limited to the range to which synchronous signals are reachable. Therefore, it is difficult to apply this technique to an inter-vehicle communication system, for example, which is configured by wireless communication units that could be mobile on a widespread scale.

SUMMARY

The present disclosure provides a technique that enables synchronization with another communication unit without setting up a synchronization device.

According to an aspect of the present disclosure, there is provided a wireless communication system, comprising: a plurality of wireless communication units that wirelessly transmit and receive data, the plurality of wireless communication units including a first, second and third wireless communication units.

The first wireless communication unit is configured to: (i) receive first data including identification information associated with the first data transmitted from the third wireless communication unit; (ii) generate, when the first wireless communication unit needs to share a specific time with the second wireless communication unit, second data associated with a first reception time of the received first data; and (iii) transmit (a) the identification information included in the received first data and (b) the second data associated with the first reception time of the first data.

The second wireless communication unit is configured to: (i) receive the first data including the identification information transmitted from the third wireless communication unit; (ii) receive the identification information and the second data transmitted from the first wireless communication unit; and (iii) calculate, upon reception of the identification information and the second data transmitted from the first wireless communication unit, if it is judged that the first data has previously been received based on the identification information, a time value needed to synchronize with the first wireless communication unit, based on a second reception time of the first data previously received at the second wireless communication unit and the first reception time of the first data associated with the second data transmitted from the first wireless communication unit.

In the wireless communication system of the present disclosure, when the first and second wireless communication units have already received data from the third wireless communication unit, the second wireless communication unit can calculate a time value which is required to establish time synchronization with the first wireless communication unit. Thus, the second wireless communication unit can synchronize with the first wireless communication unit, without the necessity of setting up a special device for transmitting synchronous signals.

In the aspect of the present disclosure, the first wireless communication unit may be configured to transmit the second data including a first reception time at which the first data transmitted from the third communication unit was received.

The second wireless communication unit may be configured to calculate, as the time value needed to synchronize with the first wireless communication unit, a time difference between a time reference of the first wireless communication unit and a time reference of the second wireless communication unit, by comparing a second reception time of the first data previously received at the second wireless communication unit with the first reception time included in the second data transmitted from the first wireless communication unit.

In this case, the second wireless communication unit can acquire a time difference between a clock of the first wireless communication unit and a clock of the second wireless communication unit, for synchronization with the first wireless communication unit.

In the aspect of the present disclosure, the first wireless communication unit may be configured to transmit the second data including an elapsed time from a first reception time, at which the first data transmitted from the third wireless communication unit was received, to the specific time.

The second wireless communication unit may be configured to calculate, as the time value needed to synchronize with the first wireless communication unit, a value of the specific time in time reference of the second wireless communication unit, by adding a second reception time of the first data previously received at the second wireless communication unit to the elapsed time included in the second data transmitted from the first wireless communication unit.

In this case, the second wireless communication unit is able to recognize a specific time with reference to a reception time at which the first wireless communication unit has received data from the third wireless communication unit. Thus, the second wireless communication unit can synchronize with the first wireless communication unit.

BRIEF DESCRIPTION OF DRAWINGS

In the accompanying drawings:

FIG. 2 is a flow chart showing a vehicle-data transmission process, according to the first embodiment;

FIG. 3 is a flow chart showing a sync-data transmission process, according to the first embodiment;

FIG. 4 is a flow chart showing a data reception process, according to the first embodiment;

FIG. 20 is a flow chart showing a sync-data transmission process, according to a modification of the first embodiment.

DESCRIPTION OF EMBODIMENTS

With reference to the accompanying drawings, hereinafter are described some exemplary embodiments of the present invention.

(First Embodiment)

Figure 1:
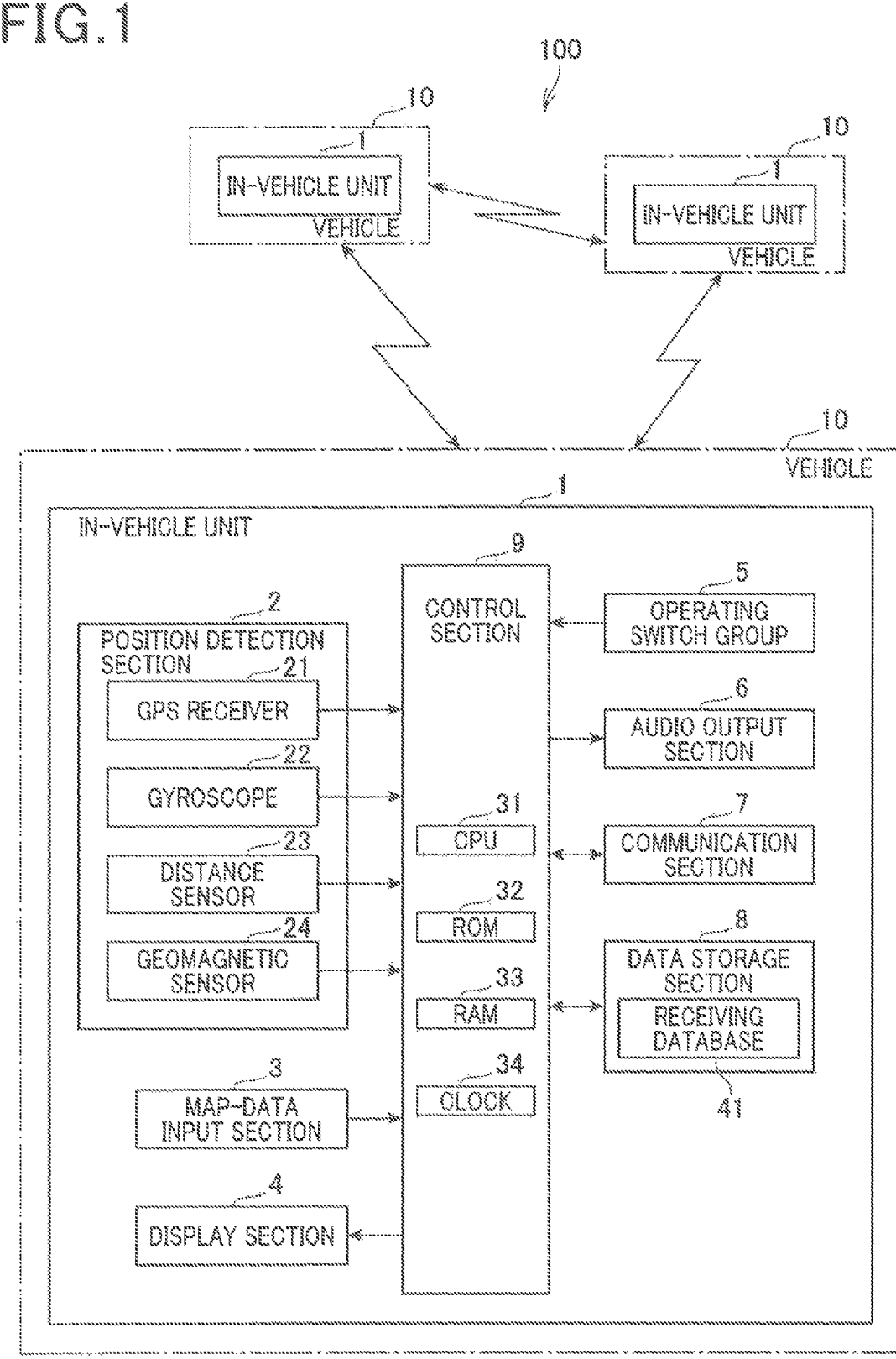
FIG. 1 is a block diagram showing a configuration of a wireless communication unit, according to first to fourth embodiments of the present invention.

FIG. 1 shows a wireless communication system 100 according to the first embodiment. As shown in FIG. 1, the wireless communication system 100 is configured by a plurality of in-vehicle units 1 each being installed in a vehicle 10 to perform wireless communication with a different vehicle 10 (inter-vehicle communication).

Each in-vehicle unit 1 includes a position detection section 2, map-data input section 3, display section 4, operating switch group 5, audio output section 6, communication section 7, data storage section 8 and control section 9.

The position detection section 2 includes a GPS (Global Positioning System) receiver 21, a gyroscope 22, a distance sensor 23 and a geomagnetic sensor 24. The GPS receiver 21 receives radio waves from a GPS satellite via a GPS antenna, not shown, to output received signals of the radio waves. The gyroscope 22 detects rotational motion applied to the vehicle. The distance sensor 23 detects a distance that the vehicle has run, on the basis of the acceleration in the longitudinal direction, or the like, of the vehicle. The geomagnetic sensor 24 detects a running azimuth on the basis of geomagnetism.

The map-data input section 3 inputs various data stored in a map storage medium, not shown. The map storage medium stores map data (node data, link data, cost data, road data, geographic data, mark data, intersection data, temporary stop point data, facility data, etc.), audio data for objects, and the like. The storage medium that stores such data may be a CD-ROM (compact disc read only memory), a DVD-ROM (digital versatile disc read only memory), a hard disc and a memory card.

The display section 4 corresponds to a color display device having a display screen for vehicle occupants. The display screen shows a map image based on the map data that have been inputted from the map-data input section 3. The display screen also shows additional data superposed on the map image, the additional data including a mark indicating the vehicle's actual location detected by the position detection section 2, as well as a guide route, names, landmarks, various facilities' marks, and the like, up to the destination.

The operating switch group 5 includes a touch panel which is integrated with a display surface of the display section 4, mechanical key switches which are provided around the display section 4, and the like. The operating switch group 5 can be operated by vehicle occupants such that various instructions are input into the control section 9.

The audio output section 6 audibly outputs various types of audio, for example, a guide to a facility, which has been inputted from the map-data input section 3.

The communication section 7 is configured as a communication interface that can perform wireless communication with the communication section 7 of the in-vehicle unit 1 installed in a different vehicle 10. The communication section 7 cooperates with the control section 9 to realize wireless communication based on CSMA (Carrier Sense Multiple Access). As is well known, in the communication based on CSMA, carrier sense is performed to recognize that the line is uninterruptedly free for a duration equal to or longer than a wait time that has been randomly set in advance, and then data is transmitted.

The data storage section 8 is a memory for storing various data and includes a receiving database 41 that stores data received from the communication section 7 installed in a different vehicle 10.

The control section 9 includes a CPU (central processing unit) 31, a ROM (read only memory) 32 and a RAM (random access memory) 33. The CPU 31 executes a program stored in the ROM 32 such that various functions are realized, such as a map-indicating function, a route-guiding function and a vehicle-data-transmitting function.

For example, the control section 9 specifies the location, speed and running azimuth of the own vehicle on the basis of a detection signal inputted from the position detection section 2. Then, the control section 9 generates vehicle data that is a description on the information regarding the specified location, speed and running azimuth of the own vehicle. After that, the control section 9 transmits the generated vehicle data to an external unit via the communication section 7.

Further, the control section 9 specifies the locations of the vehicles around the own vehicle on the basis of the vehicle data received from other in-vehicle units 1 via the communication section 7. When the own vehicle approaches an intersection, the control section 9 allows the display section 4 to display an enlarged map of the intersection including the surrounding area, while also allowing the display section 4 to display on the enlarged map the marks representing the locations of the surrounding vehicles. The control section 9 determines whether or not there is any vehicle that has a high probability of colliding with the own vehicle. If it is determined that there is a vehicle having a high probability of colliding with the own vehicle, the control section 9 outputs a warning via the audio output section 6.

Similar to well-known navigation systems, the control section 9 displays a map of an area surrounding the own vehicle on the image screen of the display section 4, while searching a route to a destination that has been inputted by a vehicle occupant via the operating switch group 5. As a result of the search, the control section 9 displays a route to the destination on the image screen of the display section 4 to thereby guide the vehicle occupant to the destination along the route.

The control section 9 includes a clock 34 that measures time by counting internal clock pulses generated in the CPU of the control section 9.

In the in-vehicle unit 1 configured as described above, the control section 9 carries out a vehicle-data transmission process, a sync-data transmission process and a data reception process, which will be described later.

First, referring to FIG. 2, hereinafter is described a vehicle-data transmission process performed by the control section 9. FIG. 2 shows the vehicle-data transmission process. This vehicle-data transmission process is repeatedly performed while the control section 9 is in operation.

As shown in FIG. 2, when the vehicle-data transmission process is executed, the control section 9 firstly generates, at step S10, vehicle data (corresponding to first data). Specifically, the control section 9 generates vehicle data that include the information regarding the actual location, speed and running azimuth of the own vehicle, which have been specified based on the detection signal received from the position detection section 2.

Then, at step S20, the control section 9 generates a communication packet that stores the vehicle data. The generated communication packet has a header that describes, as transmission source information, a vehicle ID that is the identification information of the in-vehicle unit 1 concerned. The header also describes a transmission data ID that is the identification information for distinguishing the transmitted data. Hereinafter, the communication packet containing the vehicle data is also referred to as vehicle-data communication packet.

Then, at step S30, the control section 9 performs carrier sense through the communication section 7 to determine whether or not other in-vehicle units 1 are communicating. The carrier sense is similar to the carrier sense based on the well-known CSMA. Specifically, the control section 9 detects a signal level of a frequency band that corresponds to carrier waves and recognizes whether or not other in-vehicle units 1 are in a state of outputting carrier waves, on the basis of the signal level.

As a result, if it is determined that other in-vehicle units 1 are in the state of outputting carrier waves, or if a preset wait time has not expired since other in-vehicle units 1 have stopped outputting carrier waves, the control section 9 determines that other in-vehicle units 1 are communicating. Otherwise, the control section 9 determines that other in-vehicle units 1 are not communicating.

If other in-vehicle units 1 are communicating (YES at step S30), the control section 9 repeats the processing of step S30 to wait until other in-vehicle units 1 stop communication. On the other hand, if other in-vehicle units 1 are not communicating (NO at step S30), the control section 9 transmits, at step S40, the vehicle-data communication packet generated at step S20 to the vehicles 10 located around the own vehicle and in the communication range, via the communication section 7. Then, the vehicle-data transmission process is halted until the next iteration.

Referring to FIG. 3, hereinafter is described a series of steps of the sync-data transmission process performed by the control section 9. FIG. 3 shows the sync-data transmission process. The sync-data transmission process is repeatedly performed by the control section 9 while it is in operation.

As shown in FIG. 3, when the sync-data transmission process is executed, the control section 9 firstly determines, at step S110, whether or not preset sync-data transmission conditions are met. In the present embodiment, the control section 9 determines the sync-data transmission conditions as having been met when a preset time (e.g., three minutes) has expired from the previous transmission of a sync communication packet (described later).

If the sync-data transmission conditions are not met (NO at step S10), the control section 9 halts the sync-data transmission process until the next iteration.

On the other hand, if the sync-data transmission conditions are met (YES at step S110), the control section 9 generates, at step S120, a sync communication packet (corresponding to second data).

The generated sync communication packet stores sync data concerning the vehicle-data communication packets that have been received by the in-vehicle unit 1 concerned during the period from when a sync communication packet has been previously transmitted until the present time point. Specifically, among the data in the vehicle-data communication packets received during the period, the sync-data include, for each of other in-vehicle units 1, a reception time (corresponding to a first reception time) of the latest vehicle-data communication packet and a vehicle ID corresponding to the reception time.

Further, the generated sync communication packet stores a vehicle ID that is the identification information of the in-vehicle unit 1 of the own vehicle, as generation source information that indicates the in-vehicle unit 1 that has generated the sync communication packet.

The generated sync communication packet has a header that describes, as transmission source information, the vehicle ID that is the identification information of the in-vehicle unit 1 of the own vehicle.

After that, at step S130, the control section 9 performs carrier sense through the communication section 7 to determine whether or not other in-vehicle units 1 are communicating. The carrier sense is similar to the carrier sense based on the well-known CSMA. If other in-vehicle units 1 are determined to be communicating (YES at step S130), the control section 9 repeats the processing of step S130 to wait until other in-vehicle units 1 stop communication.

On the other hand, if other in-vehicle units 1 are determined not to be communicating (NO at step S130), the control section 9 transmits, at step S140, the sync communication packet generated at step S120 to the vehicles 10 located around the own vehicle and in the communication range, via the communication section 7. Then, the sync-data transmission process is halted until the next iteration.

Referring to FIG. 4, hereinafter is described a series of steps of the data reception process performed by the control section 9. FIG. 4 shows the data reception process. The data reception process is repeatedly performed by the control section 9 while it is in operation.

As shown in FIG. 4, when the data reception process is executed, the control section 9 firstly determines, at step S210, whether or not any communication packets has been received from other in-vehicle units 1. If no communication packet has been received (NO at step S210), the control section 9 halts the data reception process until the next iteration. On the other hand, if any communication packet has been received (YES at step S210), the control section 9 determines, at step S220, whether or not the received communication packet is a vehicle-data communication packet.

If the communication packet is a vehicle-data communication packet (YES at step S220), the control section 9 extracts, at step S230, vehicle data and a vehicle ID from the received vehicle-data communication packet. The extracted vehicle data and vehicle ID are correlated to a reception time (corresponding to a second reception time) of the vehicle-data communication packet and stored in the receiving database 41. Then, the data reception process is halted until the next iteration.

On the other hand, if the communication packet is not a vehicle-data communication packet (NO at step S220), the control section 9 determines that the received communication packet is a sync communication packet. Then, at step S240, the control section 9 synchronizes time of the clock 34 using the sync data stored in the received sync communication packet.

Specifically, the control section 9 firstly selects latest reception times correlated to the same vehicle ID, one from among the reception times of the vehicle-data communication packets stored in the receiving database 41, and one from among the reception times of the sync-data stored in the received sync communication packet. Then, the control section 9 calculates a time difference between the selected reception times and puts the clock 34 backward or forward by the time corresponding to the time difference. Thus, the time of the clock 34 of the in-vehicle unit 1 concerned can be synchronized with the time of the clock 34 of a different in-vehicle unit 1 that is the transmission source of the received vehicle-data communication packet.

After that, at step S250, the control section 9 performs carrier sense through the communication section 7 to determine whether or not other in-vehicle units 1 are communicating. The carrier sense is similar to the carrier sense based on the well-known CSMA. If other in-vehicle units 1 are determined to be communicating (YES at step S250), the control section 9 repeats the processing of step S250 to wait until other in-vehicle units 1 stop communication.

On the other hand, if other in-vehicle units 1 are determined not to be communicating (NO at step S250), the control section 9 transfers, at step S260, the received sync communication packet to other in-vehicle units 1. In other words, the control section 9 extracts, from the received sync communication packet, sync data and a vehicle ID as generation source information to generate and transmit a communication packet. The communication packet includes the extracted sync-data and vehicle ID, with an addition of a header that describes a vehicle ID that is the identification information of the in-vehicle unit 1 concerned.

After completing the processing of step S260 (i.e. transfer of the sync communication packet), the data reception process is halted until the next iteration.

Figure 5:
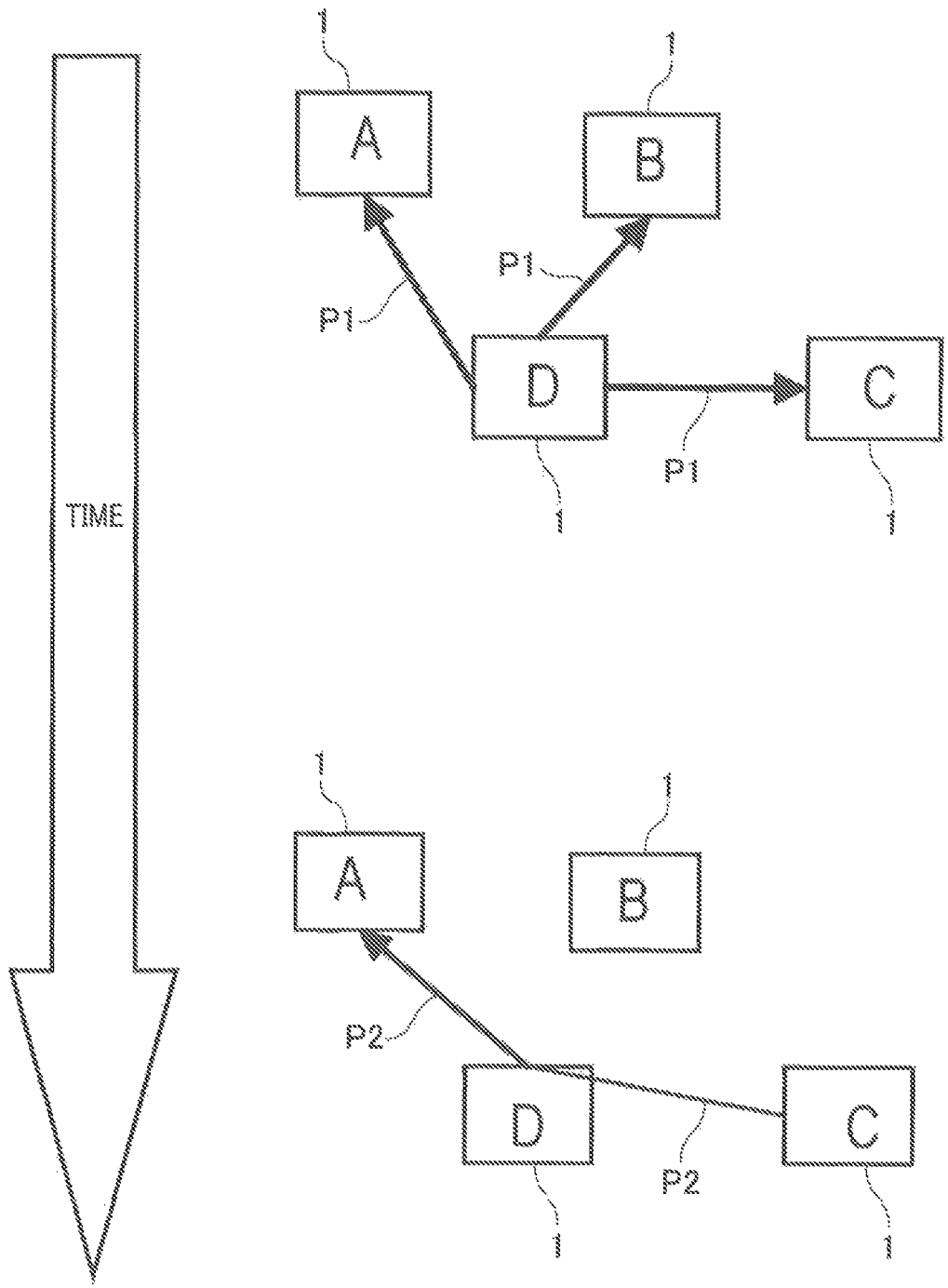
FIG. 5 is an explanatory diagram showing a process of synchronization, according to the first embodiment.

Referring now to FIG. 5, hereinafter is described how the in-vehicle unit 1 configured in this way synchronizes with other in-vehicle units 1.

FIG. 5 shows the process of synchronization. As shown in FIG. 5, for example, an in-vehicle unit D transmits a vehicle-data communication packet P1 to in-vehicle units A, B and C. The in-vehicle units A, B and C receive the vehicle-data communication packet P1 and record the reception time. The timing that the in-vehicle units A, B and C receive the data communication packet P1 is substantially the same.

After that, the in-vehicle unit C transmits a sync communication packet P2 to the in-vehicle unit A. The sync communication packet P2 stores sync data that includes the reception time of the vehicle-data communication packet P1 and the vehicle ID of the in-vehicle unit D. Thus, the in-vehicle unit A can obtain a difference between the reception time included in the received sync communication packet P2 and the time at which the in-vehicle unit A has received the vehicle-data communication packet P1.

Then, as mentioned above, since the timing of receiving the data communication packet P1 is substantially the same between the in-vehicle units A and C, the in-vehicle unit A can synchronize with the in-vehicle unit C based on the time difference.

It should be appreciated that the sync communication packet P2 is received by the in-vehicle unit A after being transferred from the in-vehicle unit D. However, the time of receiving the sync communication packet P2 by the in-vehicle A is not used for synchronization. Therefore, the time taken for the in-vehicle unit D to transfer the sync communication packet P2 has no influence on the accuracy of synchronization between the in-vehicle units A and C.

In the wireless communication system 100 configured in this way, the in-vehicle units 1 operate as follows. Specifically, a first in-vehicle unit 1 comes to have a necessity of sharing a specific time with a second in-vehicle unit 1. In this case, the first in-vehicle unit 1 transmits a sync communication packet to the second in-vehicle unit 1. The sync communication packet stores sync data that include a vehicle ID of a vehicle-data communication packet received from a third in-vehicle unit 1 and the reception time of the vehicle-data communication packet (steps S120 and S140).

Then, upon reception of the sync communication packet from the first in-vehicle unit 1 (YES at step S210 and NO at step S220), the second in-vehicle unit 1 refers to the vehicle ID to retrieve previously received data. If any data have been previously received, the second in-vehicle unit 1 acquires a time difference between the time of the clock 34 of the first in-vehicle unit 1 and the time of the clock 34 of the second in-vehicle unit 1. This time difference is acquired on the basis of the previous reception time in the second in-vehicle unit 1 concerned and the reception time stored in the received sync communication packet (step S240).

Thus, the second in-vehicle unit 1 can synchronize with the first in-vehicle unit 1, without the necessity of setting up a special device for transmitting synchronous signals.

Since the in-vehicle 1 performs transmission based on CSMA, the transmission timing of a communication packet is randomly set. However, the reception time included in the sync communication packet is the time for the first in-vehicle unit 1 to receive the communication packet from the third in-vehicle unit 1. Therefore, the accuracy of synchronization will not be adversely affected by the random change of the transmission timing.

In the embodiment described above, the in-vehicle unit 1 corresponds to the wireless communication unit of the present invention, while the vehicle ID corresponds to the identification information of the present invention.

(Second Embodiment)

Figure 6:
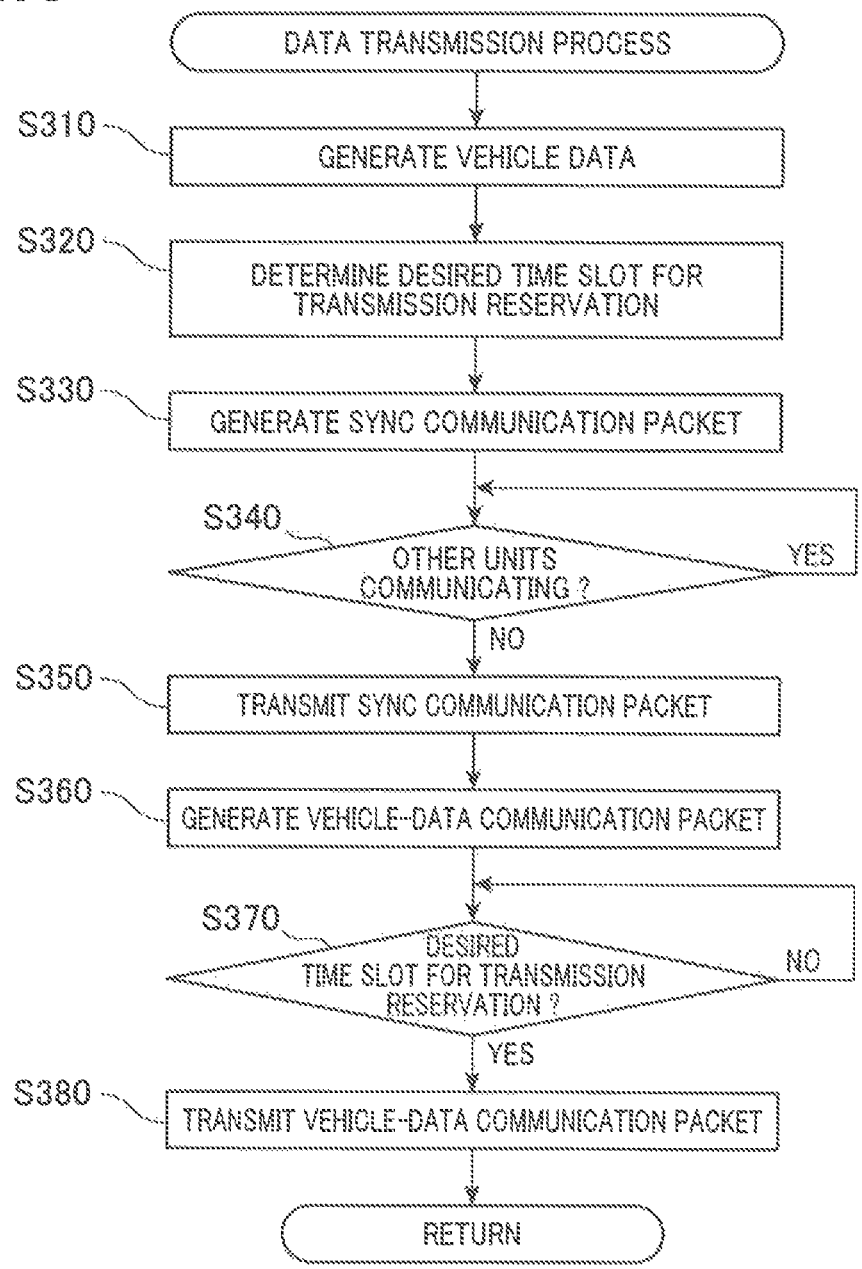
FIG. 6 is a flow chart showing a data transmission process, according to the second embodiment.
Figure 7:
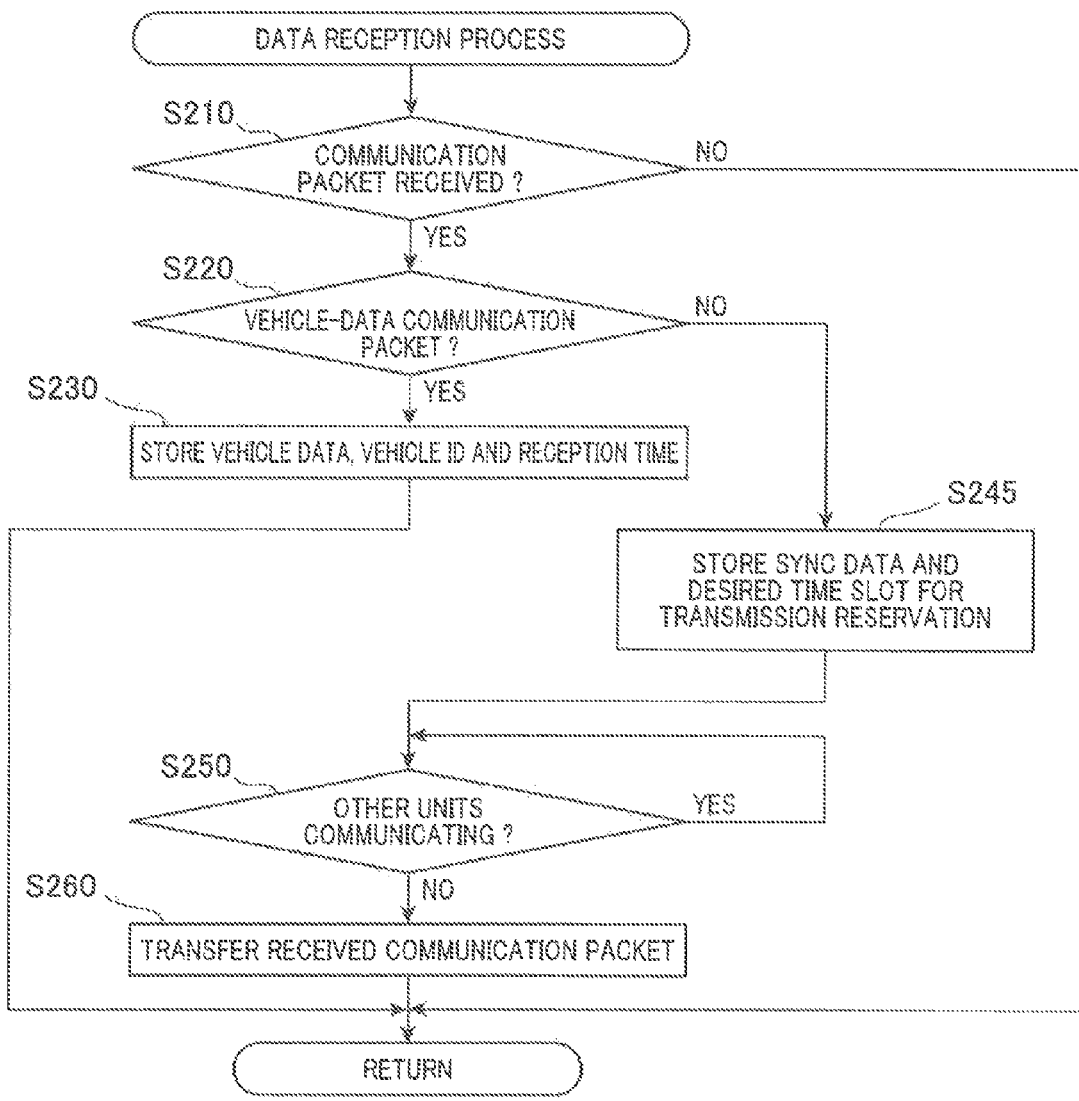
FIG. 7 is a flow chart showing a data reception process, according to the second embodiment.

Referring to FIGS. 6 and 7, a second embodiment of the present invention will be described. In the second embodiment, description is focused on the differences from the first embodiment. In the second and the subsequent embodiments, the components identical with or similar to those in the first embodiment are given the same reference numerals for the sake of omitting unnecessary explanation.

The in-vehicle unit 1 of the second embodiment is different from that of the first embodiment in that a data transmission process is performed instead of the vehicle-data transmission process and the sync-data transmission process, and that the data reception process has been changed. The configuration other than this is the same as the first embodiment.

Referring first to FIG. 6, a series of steps of the data transmission process is described. FIG. 6 shows the data transmission process performed by the control section 9, according to the second embodiment. The data transmission process is repeatedly performed while the control section 9 is in operation.

When the data transmission process is executed, the control section 9 firstly generates vehicle data at step S310 in a manner similar to step S10. Then, at step S320, the control section 9 determines a desired time slot for transmission reservation for transmitting the vehicle-data communication packet which stores the vehicle data generated at step S310.

The receiving database 41 stores reception times at which vehicle-data communication packets have been received from other in-vehicle units 1 (refer to step S230 of FIG. 7), sync-data stored in the sync communication packets received from other in-vehicle units 1 (refer to step S245 of FIG. 7), and information for specifying a desired time slots for transmission reservation of other in-vehicle units 1 (refer to step 245 of FIG. 7).

In the processing of step S320, the control section 9 uses these pieces of information to determine its own desired time slot for transmission reservation so as not to coincide with the desired time slots for transmission reservation of other in-vehicle units 1. The method of determining the desired time slot for transmission reservation will be described later.

Further, at step S330, the control section 9 generates a sync communication packet. The generated sync communication packet stores sync data concerning the vehicle-data communication packets that have been received by the in-vehicle unit 1 concerned during the period from when a sync communication packet has been previously transmitted until the present time point. Specifically, among the data in the vehicle-data communication packets received during the period, the sync data include, for each of other in-vehicle units 1, a reception time of the latest vehicle-data communication packet and a vehicle ID corresponding to the reception time. The generated sync communication packet also stores information of desired time slot for transmission reservation (hereinafter referred to as "time slot information") that indicates the desired time slot for transmission reservation determined at step S320.

The generated sync communication packet has a header that describes, as transmission source information, a vehicle ID that is the identification information of the in-vehicle unit 1 concerned.

Then, at step S340, the control section 9 performs carrier sense through the communication section 7 to determine whether or not other in-vehicle units 1 are communicating.

The carrier sense is similar to the carrier sense based on the well-known CSMA. If other in-vehicle units 1 are determined to be communicating (YES at step S340), the control section 9 repeats the processing of step S340 to wait until other in-vehicle units 1 stop communication.

On the other hand, if other in-vehicle units 1 are determined not to be communicating (NO at step S340), the control section 9 transmits, at step S350, the sync communication packet generated at step S330 to the vehicles 10 located around the own vehicle and in the communication range, via the communication section 7.

Then, at step S360, the control section 9 generates a communication packet that stores the vehicle data generated at step S310 (vehicle-data communication packet) in a manner similar to step S20.

Then, at step S370, the control section 9 determines whether or not a start time of the desired time slot for transmission reservation determined at step S320 has come. If the start time of the desired time slot for transmission reservation has not yet come (NO at step S370), the processing of step S370 is repeated to wait until the start time of the desired time slot for transmission reservation comes.

On the other hand, if the start time of the desired time slot for transmission reservation has come (YES at step S370), the control section 9 transmits, at step S380, the vehicle-data communication packet generated at step S360 to the vehicles 10 located around the own vehicle and in the communication area, via the communication section 7. Then, the data transmission process is halted until the next iteration.

Referring to FIG. 7, a series of steps of the data reception process according to the second embodiment is described. FIG. 7 shows the data reception process. The data transmission process of the second embodiment is different from that of the first embodiment only in that processing of step S245 is performed instead of the processing of step S240.

Specifically, at step S220, if the received communication packet is not a vehicle-data communication packet (NO at step S220), the control section 9 determines that the received communication packet is a sync communication packet and control proceeds to step S245. At step S245, the control section 9 stores in the receiving database 41 the sync data and the desired time slot for transmission reservation stored in the received sync communication packet and control proceeds to step S250.

Hereinafter is specifically described the method of determining a desired time slot for transmission reservation.

As mentioned above, the sync data stored in the receiving database 41 include the time slot information of other in-vehicle units 1 and reception times at which other in-vehicle units 1 have received vehicle-data communication packets (hereinafter each of these reception times is referred to as "sync reception time"). The receiving database 41 also stores reception times at which vehicle-data communication packets have been directly received from other in-vehicle units 1 (hereinafter each of these reception times is referred to as "direct reception time").

At step S320, the control section 9 firstly selects latest direct reception times correlated to the same vehicle ID, one from among the direct reception times, and one from among the sync reception times stored in the receiving database 41. Then, the control section 9 calculates the time difference between the selected reception times, and puts backward or forward the desired time slots for transmission reservation indicated by the time slot information, by the time corresponding to the time difference to thereby correct the desired time slots for transmission reservation of other in-vehicle units 1.

For example, here, the time difference is Ta between a direct reception time and a sync reception time (however, the direction reception time is earlier than the sync reception time), and a desired time slot for transmission reservation ranges from transmission start time T1 to transmission end time T2. The control section 9 corrects the desired time slot for transmission reservation so as to range from transmission start time (T1+Ta) to transmission end time (T2+Ta).

The control section 9 corrects all the desired time slots for transmission reservation that occur on or after the present time point referring to the time slot information stored in the receiving database 41. Then, the control section 9 determines its own desired time slot for transmission reservation so as not to coincide with the corrected desired time slots for transmission reservation.

In the wireless communication system 100 configured in this way, the in-vehicle units 1 operate as follows. Specifically, a first in-vehicle unit 1 comes to have a necessity of sharing specific time with a second in-vehicle unit 1. In this case, the first in-vehicle unit 1 transmits a sync communication packet to the second in-vehicle unit 1. The sync communication packet stores sync data that include the vehicle ID of a vehicle-data communication packet received from a third in-vehicle unit 1, the reception time of the vehicle-data communication packet and the time slot information (steps S330 and S350).

Then, upon reception of the sync communication packet from the first in-vehicle unit 1 (YES at step S210 and NO at step S220), the second in-vehicle unit 1 refers to the vehicle ID to retrieve previously received data. If any data have been previously received, the second in-vehicle unit 1 acquires a time difference between the time of the clock 34 of the first in-vehicle unit 1 and the time of the clock 34 of the second in-vehicle unit 1. The time difference is acquired on the basis of the previous reception time in the second in-vehicle unit 1 concerned and the reception time stored in the received sync communication packet (steps S245 and S320).

Then, in the second in-vehicle unit 1, the control section 9 puts backward or forward the desired time slot for transmission reservation indicated by the time slot information stored in the received sync communication packet to thereby correct the desired time slot for transmission reservation of the in-vehicle unit 1 that has transmitted the sync communication packet.

Thus, the second in-vehicle 1 is able to set the time of its own data transmission to the time when the in-vehicle 1 that has transmitted the sync communication packet does not transmit data. Accordingly, without the necessity of synchronizing each others' clocks, the second in-vehicle unit 1 is able to virtually synchronize with the first in-vehicle unit 1 that has transmitted the sync communication packet.

In this way, the in-vehicle unit 1 according to the second embodiment can enjoy the same advantages as those of the in-vehicle unit 1 according to the first embodiment.

In the present embodiment described above, the reception time of sync data and the time slot information correspond to the elapsed time information of the present invention.

(Third Embodiment)

Figure 8:
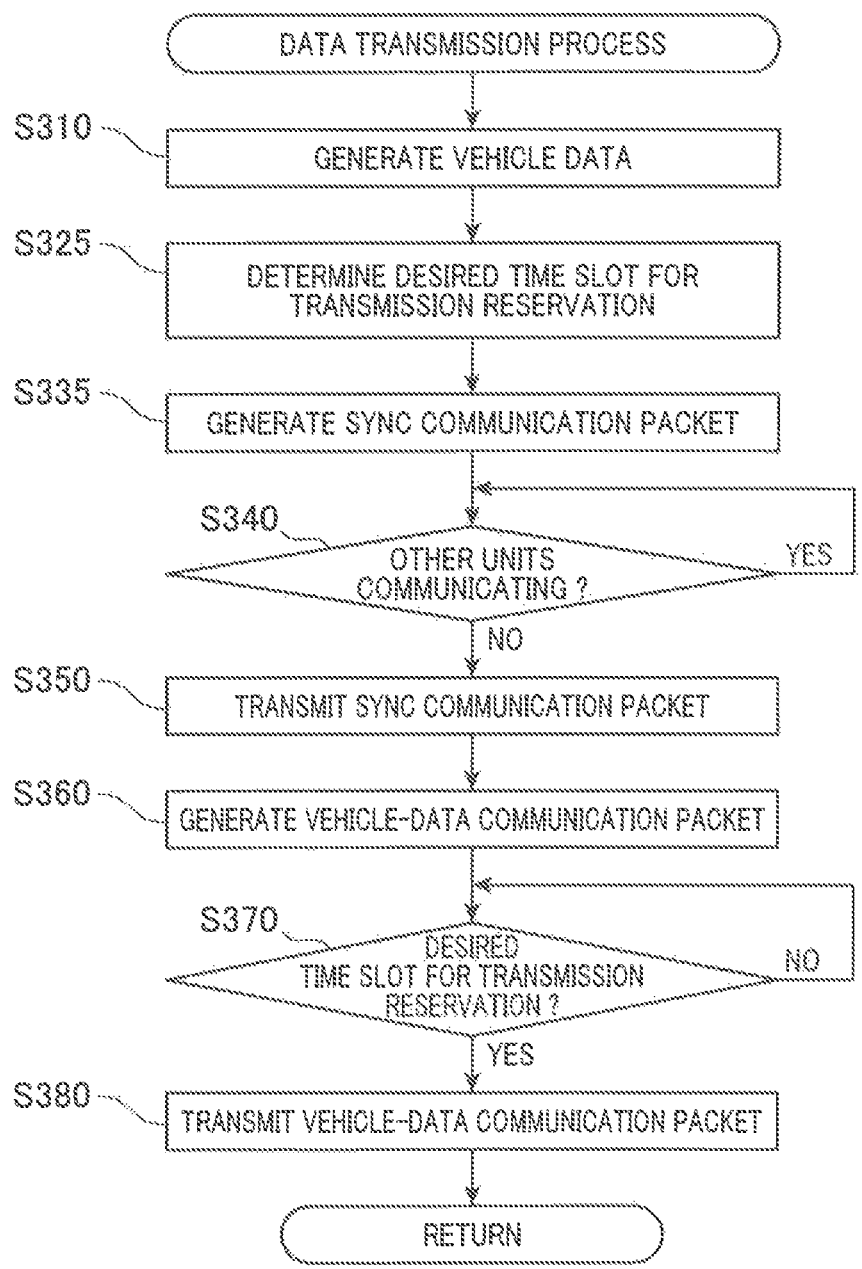
FIG. 8 is a flow chart showing a data transmission process, according to the third embodiment.
Figure 9:
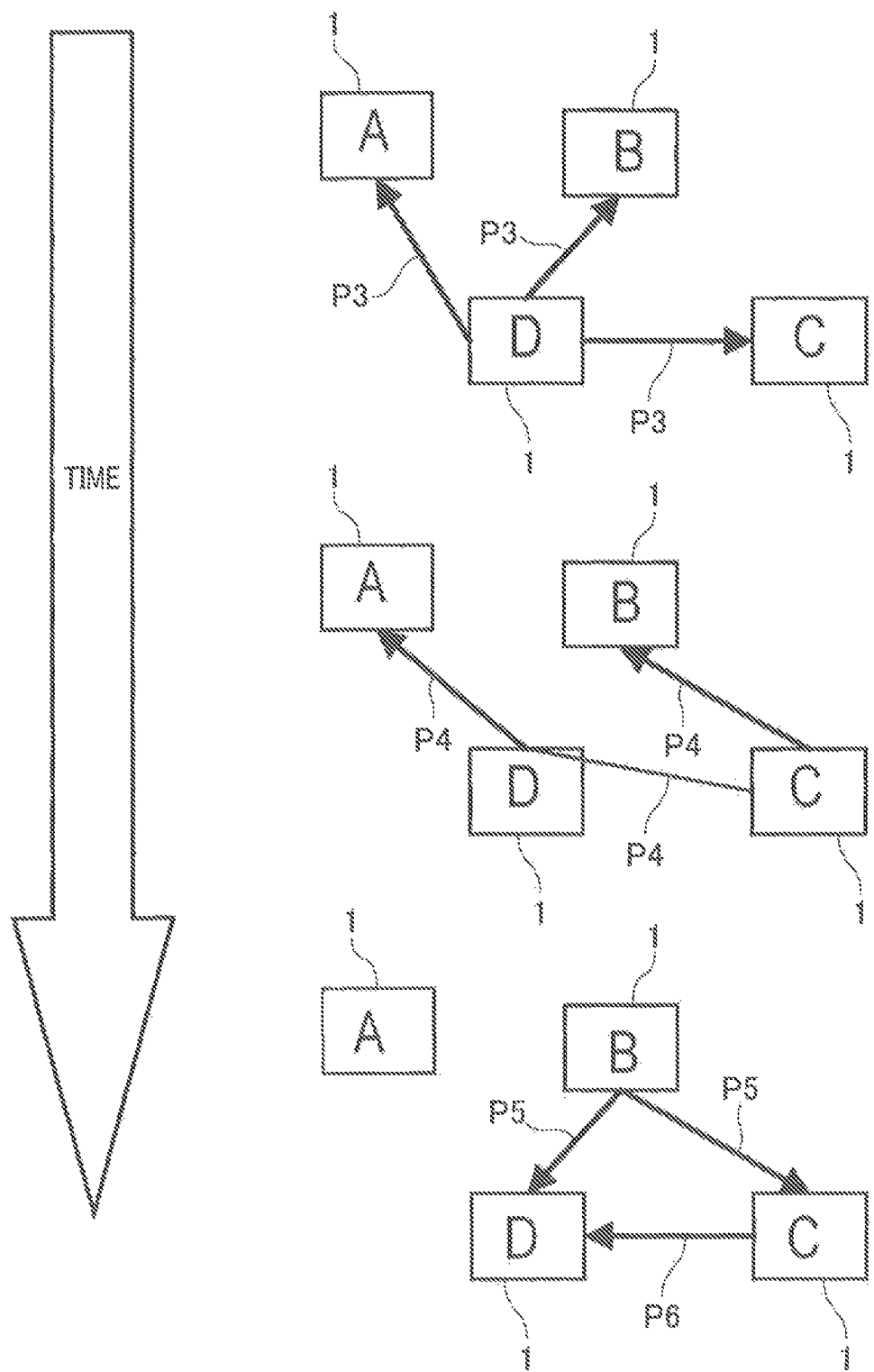
FIG. 9 is an explanatory diagram showing illustrating a process of synchronization, according to the third embodiment.

Referring to FIGS. 8 and 9, hereinafter is described a third embodiment of the present invention. In the third embodiment, description is focused on the differences from the exemplary second embodiment.

The in-vehicle unit 1 according to the third embodiment is different from that of the second embodiment only in that the data transmission process has been changed.

Referring to FIG. 8, a series of steps of the data transmission process of the third embodiment is described.

FIG. 8 shows the data transmission process. As shown in FIG. 8, in the data transmission process of the third embodiment, steps S320 and S330 of the second embodiment are replaced by steps S325 and S335. Other processings are the same as those of the second embodiment.

At step S335, the control section 9 refers to the vehicle-data communication packets that have been received by the in-vehicle unit 1 concerned from other in-vehicle units 1 during the period from when a sync communication packet has been previously transmitted until the present time point. Referring to the vehicle-data communication packets received in the period, the control section 9 selects a reception time of the latest vehicle-data communication packet for one of other in-vehicle units 1. Using the selected reception time as a reference, the control section 9 calculates a start time and an end time of the desired time slot for transmission reservation that has been determined at step S320.

Hereinafter, the reception time selected as mentioned above is referred to as "selected reception time". Further, the start time and the end time calculated with reference to the selected reception time are hereinafter referred to as "reference reservation start time" and "reference reservation end time", respectively.

At step S335, the control section 9 further refers to the vehicle-data communication packets that have been received by the in-vehicle unit 1 concerned from other in-vehicle units 1 during the period from when a sync communication packet has been previously transmitted until the present time point. Referring to the vehicle-data communication packets received in the period, the control section 9 selects a reception time of the latest vehicle-data communication packet for each of the in-vehicle units 1 other than the one corresponding to the selected reception time. For each of the reception times selected as above, the control section 9 calculates a time difference from the selected reception time.

At step S335, the control section 9 generates a sync communication packet that stores sync data including the vehicle ID corresponding to the selected reception time, the time differences for the in-vehicle units 1 other than the in-vehicle unit 1 corresponding to the selected reception time and the vehicle IDs corresponding to the respective time differences. The generated sync communication packet also stores the reference reservation start time and the reference reservation end time (hereinafter also referred to as "time slot information"). The generated sync communication packet has a header that describes, as transmission source information, a vehicle ID that is the identification information of the in-vehicle unit 1 concerned.

At step S325, the control section 9 determines a desired time slot for transmission reservation for transmitting the vehicle-data communication packet that stores the vehicle data generated at step S310.

The receiving database 41 stores reception times at which vehicle-data communication packets have been received from other in-vehicle units 1 (direct reception times), sync data stored in the sync communication packets received from other in-vehicle units (refer to step S335), and reference reservation start times and reference reservation end times for specifying the desired time slots for transmission reservation of other in-vehicle units 1 (refer to step S335). In the processing of step S325, based on these pieces of information, the control section 9 determines its own desired time slot for transmission reservation so as not to coincide with the desired time slots for transmission reservation of other in-vehicle units 1.

Specifically, the control section 9 firstly selects the latest direct reception time correlated to a vehicle ID) that is the same as the one corresponding to the selected reception time, from among the direct reception times stored in the receiving database 41. Then, the control section 9 sets a desired time slot for transmission reservation of the in-vehicle unit 1 having the vehicle ID) corresponding to the selected reception time. The set desired time slot for transmission reservation, in this case, ranges from a time obtained by adding the reference reservation start time to the selected direct reception time, to a time obtained by adding the reference reservation end time to the selected direct reception time.

On the other hand, if there is no direct reception time correlated to a vehicle ID that is the same as the one corresponding to the selected reception time among the direct reception times stored in the receiving database 41, the control section 9 selects one of the direct reception times that are correlated to vehicle IDs corresponding to the time differences described above. Then, the control section 9 calculates a selected reception time on the basis of the selected direct reception time and the time difference corresponding thereto.

After that, the control section sets a desired time slot for transmission reservation of the in-vehicle unit 1 having the vehicle ID corresponding to the selected reception time. The set desired time slot for transmission reservation, in this case, ranges from a time obtained by adding the reference reservation start time to the calculated selected reception time, to a time obtained by adding the reference reservation end time to the calculated selected reception time.

The control section 9 sets the desired time slots for transmission reservation as described above for all the reference reservation start times and the reference reservation end times that occur on or after the present time, which are stored in the receiving database 41. Then, the control section 9 determines its own desired time slot for transmission reservation so as not to coincide with the set desired time slots for transmission reservation.

Referring to FIG. 9, hereinafter is described how the in-vehicle unit 1 configured as described above synchronizes with other in-vehicle units 1. FIG. 9 shows a process of synchronization, according to the third embodiment.

For example, as shown in FIG. 9, an in-vehicle unit D transmits a vehicle-data communication packet P3 to in-vehicle units A, B and C. Upon reception of the vehicle-data communication packet P3, the in-vehicle units A, B and C each record the reception time.

After that, the in-vehicle unit C transmits a sync communication packet P4 to the in-vehicle units A, B and D. The sync communication packet P4 stores sync data including a reference reservation start time and a reference reservation end time (i.e. a desired time slot for transmission reservation with reference to the reception time of the vehicle-data communication packet P3) and the vehicle ID of the in-vehicle unit D.

Thus, each of the in-vehicle units A and B is able to acquire, in its own clock, the desired time slot for transmission reservation of the in-vehicle unit C, by adding the reference reservation start time and the reference reservation end time to the reception time of receiving the vehicle-data communication packet P3.

However, the in-vehicle unit D is the transmission source of the vehicle-data communication packet P3 and has not received the vehicle-data communication packet P3. Thus, the in-vehicle unit D cannot acquire the reception time of the vehicle-data communication packet P3. In other words, the in-vehicle unit D is not able to acquire, in its own clock, the desired time slot for transmission reservation of the in-vehicle unit C.

In this regard, the in-vehicle unit B transmits a vehicle-data communication packet P5 to the in-vehicle units C and D. Upon reception of the vehicle-data communication packet P5, the in-vehicle units C and D record the reception time.

Then, the in-vehicle unit C transmits a sync communication packet P6. The sync communication packet P6 stores sync data including a time difference between the reception time at which the vehicle-data communication packet P3 has been received and the reception time at which the vehicle-data communication packet P5 has been received, and the vehicle ID of the in-vehicle unit B.

Thus, the in-vehicle unit D is able to acquire, in its own clock, the desired time slot for transmission reservation of the in-vehicle unit C, on the basis of the reception time at which the vehicle-data communication packet P5 has been received, the time difference mentioned above, and the reference reservation start time and the reference reservation end time included in the sync communication packet P4.

Accordingly, each of the in-vehicle units A, B and D is able to determine its own desired time slot for transmission reservation so as not to coincide with the desired time slot for transmission reservation of the in-vehicle unit C. In this way, the in-vehicle units A, B, C and D can virtually synchronize with each other, without the necessity of synchronizing each others' clocks.

In the wireless communication system 100 configured in this way, the in-vehicle units 1 operate as follows. Specifically, a first in-vehicle unit 1 comes to have a necessity of sharing specific time with a second in-vehicle unit 1. In this case, the first in-vehicle unit 1 transmits a sync communication packet to the second in-vehicle unit 1. The sync communication packet stores sync data including the vehicle ID of a vehicle-data communication packet received from a third in-vehicle unit 1, its reception time, and the time slot information (steps S335 and S350).

Then, upon reception of the sync communication packet from the first in-vehicle unit 1 (YES at step S210 and NO at step S220), the second in-vehicle unit 1 refers to the vehicle ID to retrieve previously received data. If any data have been previously received, the second in-vehicle unit 1 acquires a time difference between the time of the clock of the first in-vehicle unit 1 and the time of the clock of the second in-vehicle unit 1. The second in-vehicle unit 1 acquires the time difference on the basis of the previous reception time in the second in-vehicle unit 1 concerned and the reception time stored in the received sync communication packet (steps S245 and S325).

Thus, the second in-vehicle unit 1 acquires added values, i.e. a value obtained by adding the reference reservation start time to a reception time and a value obtained by added the reference reservation end time to the reception time, the reception time being the time at which the second in-vehicle unit 1 concerned has received the communication packet from the third in-vehicle unit 1.

Then, based on the clock of the second in-vehicle unit 1 concerned, the second in-vehicle unit concerned is able to recognize the desired time slot for transmission reservation for the first in-vehicle unit 1 to transmit a communication packet. Accordingly, the second in-vehicle unit 1 can set the time of transmitting its own communication packet, to a time at which the first in-vehicle unit 1 will not transmit data. In this way, the second in-vehicle unit 1 can virtually synchronize with the first in-vehicle unit 1, without the necessity of synchronizing each others' clocks.

Thus, the in-vehicle unit 1 according to the third embodiment can enjoy the advantages similar to those of the in-vehicle unit 1 according to the first embodiment.

The sync communication packet transmitted from the first in-vehicle unit 1 stores a reference reservation start time and a reference reservation end time with reference to the reception time of receiving a communication packet from the third in-vehicle unit 1. The third in-vehicle unit 1, which is a transmission source of the sync communication packet, cannot acquire the reception time of the sync communication packet. In other words, the third in-vehicle unit 1 is not able to use its own clock as a basis of recognizing the desired time slot for transmission reservation for the first in-vehicle unit 1 to transmit a communication packet.

In this regard, the first in-vehicle unit 1 transmits a sync communication packet including time difference information regarding a time difference is between a reception time at which the first in-vehicle unit 1 concerned has wirelessly received a communication packet from the third in-vehicle unit (direct reception time) and a reception time at which the first in-vehicle unit 1 concerned has wirelessly received a communication packet from an in-vehicle unit 1 different from the third in-vehicle unit 1 (hereinafter referred to as "different in-vehicle unit"). In the sync communication packet transmitted from the first in-vehicle unit 1, the time difference information is correlated to the vehicle ID for identifying the different in-vehicle unit (steps S335 and S350).

Thus, when the sync communication packet is received, the third in-vehicle unit 1 is able to recognize the time when the third in-vehicle unit 1 has transmitted the communication packet, on the basis of the reception time at which the communication packet has been received from the different in-vehicle unit, and the time difference. The timing when the third in-vehicle unit 1 has transmitted the communication packet is substantially the same as the timing when the first in-vehicle unit 1 has received the communication packet from the third in-vehicle unit 1.

Accordingly, using the reference reservation start time and the reference reservation end time, the third in-vehicle unit 1 is able to further recognize the desired time slot for transmission reservation for the first in-vehicle unit 1 to transmit the communication packet, on the basis of the clock of the third in-vehicle unit 1.

(Fourth Embodiment)

Referring to FIGS. 10 to 13, hereinafter is described a fourth embodiment of the present invention. In the fourth embodiment, description is focused on the differences from the first embodiment.

The in-vehicle unit 1 of the fourth embodiment is different from that of the first embodiment only in that a network-sync transmission process and a network-sync reception process have been added.

Figure 10:
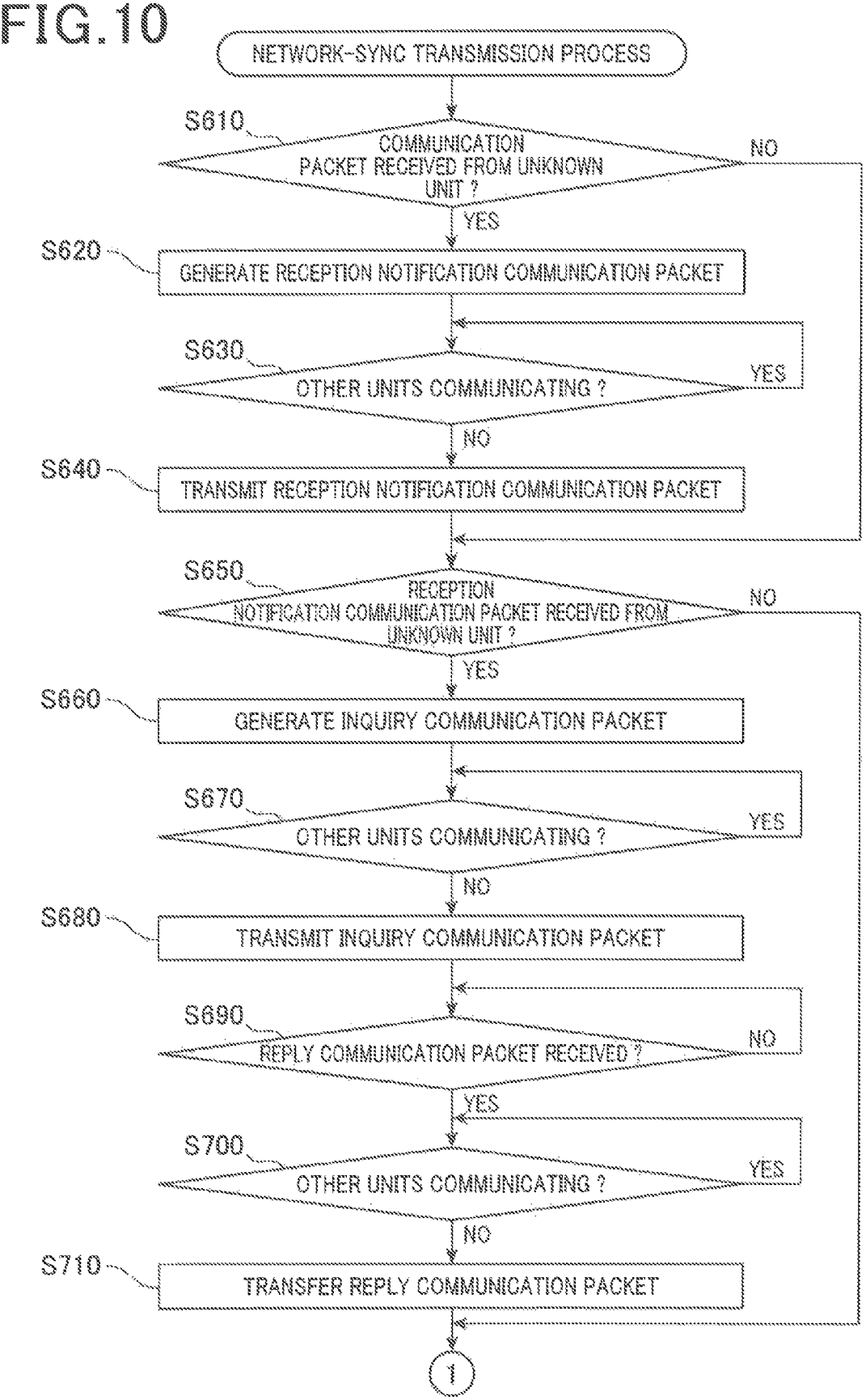
FIG. 10 is a flow chart showing a first half of a network-sync transmission process, according to the fourth embodiment.
Figure 11:
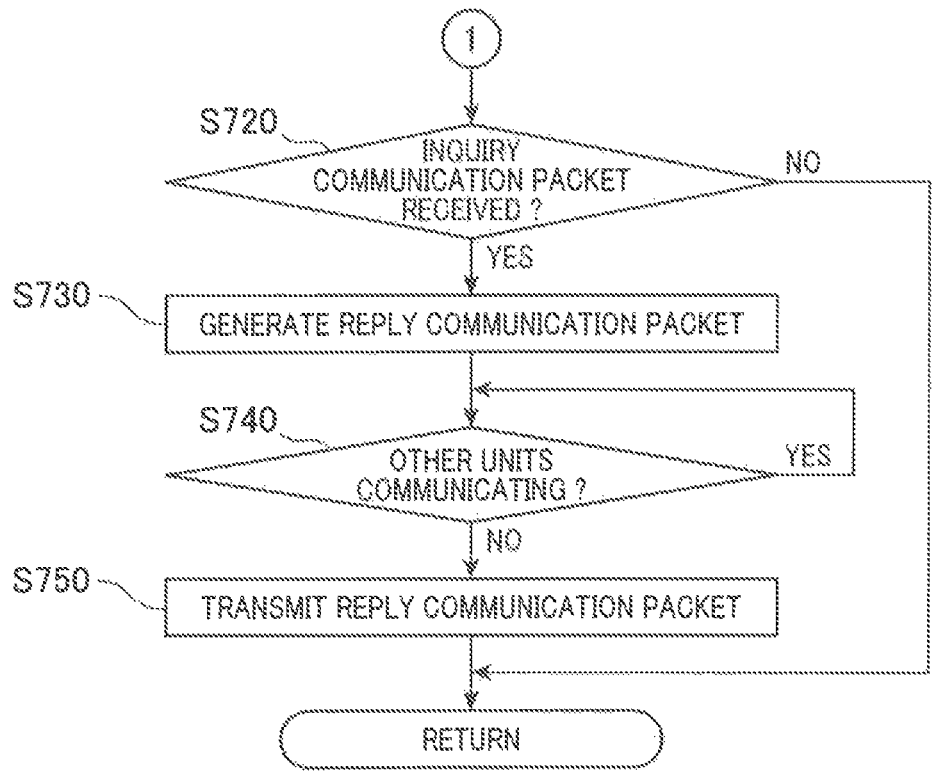
FIG. 11 is a flow chart showing a latter half of the network-sync transmission process, according to the fourth embodiment.

First, referring to FIGS. 10 and 11, hereinafter is described a series of steps of the network-sync transmission process performed by the control section 9. FIGS. 10 and 11 show a flow diagram illustrating a first half and a latter half, respectively, of the network-sync transmission process. The network-sync transmission process is repeatedly performed while the control section 9 is in operation.

When the network-sync transmission process is executed, the control section 9 firstly determines, at step S610, whether or not any communication packet has been received from any other in-vehicle unit 1 (hereinafter also referred to as "unknown in-vehicle unit 1") from which a communication packet has not been received up to then. If it is determined that no communication packet has been received from any unknown in-vehicle unit 1 (NO at step S610), the control section 9 transfers control to step S650.

On the other hand, if it is determined that a communication packet has been received from any unknown in-vehicle unit 1 (YES at step S610), the control section 9 generates, at step S620, a communication packet that stores reception notification data indicating reception of the communication packet. The reception notification data includes a vehicle ID and a transmission data ID of the received communication packet. The generated communication packet has a header that describes, as transmission source information, a vehicle ID) that is the identification information of the in-vehicle unit 1 concerned. Hereinafter, the communication packet storing the reception notification data is also referred to as a reception notification communication packet.

Then, at step S630, the control section 9 performs carrier sense through the communication section 7 to determine whether or not other in-vehicle units 1 are communicating. The carrier sense is similar to the carrier sense based on the well-known CSMA. If other in-vehicle units 1 are determined to be communicating (YES at step S630), the control section 9 repeats the processing of step S630 to wait until other in-vehicle units 1 stop communication.

On the other hand, if other in-vehicle units 1 are determined not to be communicating (NO at step S630), the control section 9 transmits, at step S640, the reception notification communication packet generated at step S620 to the vehicles 10 located around the own vehicle and in the communication area, via the communication section 7. Then, control proceeds to step S650.

At step S650, the control section 9 determines whether or not a reception notification communication packet has been received from any unknown in-vehicle unit 1. If no reception notification communication packet has been received from any unknown in-vehicle unit 1 (NO at step S650), the control section 9 transfers control to step S720.

On the other hand, if any reception notification communication packet has been received from any unknown in-vehicle unit 1 (YES at step S650), the control section 9 generates, at step S660, a communication packet that stores reception time inquiry data inquiring the reception time of the communication packet transmitted from the in-vehicle unit 1 concerned.

The reception time inquiry data includes the transmission data ID in the reception notification data included in the received reception notification communication packet. The generated communication packet has a header that describes, as transmission source information, a vehicle ID that is the identification 26 information of the in-vehicle unit 1 concerned.

Hereinafter, the communication packet that stores reception time inquiry data is also referred to as "inquiry communication packet".

Then, at step S670, the control section 9 performs carrier sense through the communication section 7 to determine whether or not other in-vehicle units 1 are communicating. The carrier sense is similar to the carrier sense based on the well-known CSMA. If other in-vehicle units 1 are determined to be communicating (YES at step S670), the control section 9 repeats the processing of step S670 to wait until other in-vehicle units 1 stop communication.

On the other hand, if other in-vehicle units 1 are determined not to be communicating (NO at step S670), the control section 9 transmits, at step S680, the inquiry communication packet generated at step S660 to the vehicles 10 located around the own vehicle and in the communication area, via the communication section 7.

After that, the control section 9 determines, at step S690, whether or not a communication packet has been received, which stores reception-time-reply data that is a reply indicating a reception time (hereinafter also referred to as "reply communication packet"), in response to the inquiry communication packet. If no reply communication packet has been received (NO at step S690), the control section 9 repeats the processing of step S690 to wait until a reply communication packet is received.

On the other hand, if a reply communication packet has been received (YES at step S690), control proceeds to step S700. At step S700, the control section 9 performs carrier sense through the communication section 7 to determine whether or not other in-vehicle units 1 are communicating. The carrier sense is similar to the carrier sense based on the well-known CSMA. If other in-vehicle units 1 are determined to be communicating (YES at step S700), the control section 9 repeats the processing of step S700 to wait until other in-vehicle units 1 stop communication.

If other in-vehicle units 1 are determined not to be communicating (NO at step S700), the control section 9 transfers, at step S710, the received reply communication packet. Specifically, the control section 9 extracts reception-time-reply data (described later) from the received reply communication packet to thereby generate and transmit a communication packet. This communication packet includes the extracted reception-time-reply data with an addition of a header that describes a vehicle ID that is the identification information of the in-vehicle unit 1 concerned.

Then, after completing the processing of step S710 (i.e. transfer of the reply communication packet), the control section 9 transfers control to step S720.

At step S720, the control section 9 determines whether or not any inquiry communication packet has been received. If no inquiry communication packet has been received (NO at step S720), the control section 9 halts the network-sync transmission process until the next iteration.

On the other hand, if any inquiry communication packet has been received (YES at step S720), control proceeds to step S730. At step S730, the control section 9 generates a communication packet that stores reception-time-reply data (reply communication packet). The reception-time-reply data indicate a reception time of the communication packet which is specified by the transmission data ID included in the reception time inquiry data stored in the inquiry communication packet. The generated communication packet has a header that describes, as transmission source information, a vehicle ID that is the identification information of the in-vehicle unit 1 concerned.

Then, at step 740, the control section 9 performs carrier sense through the communication section 7 to determine whether or not other in-vehicle units 1 are communicating. The carrier sense is similar to the carrier sense based on the well-known CSMA. If other in-vehicle units 1 are determined to be communicating (YES at step S740), the control section 9 repeats the processing of step S740 to wait until other in-vehicle units 1 stop communication.

If other in-vehicle units 1 are determined not to be communicating (NO at step S740), control proceeds to step S750. At step S750, the control section 9 transmits the reply communication packet generated at step S730 to the vehicles 10 located around the own vehicle and in the communication area, via the communication section 7. Then, the network-sync transmission process is halted until the next iteration.

Figure 12:
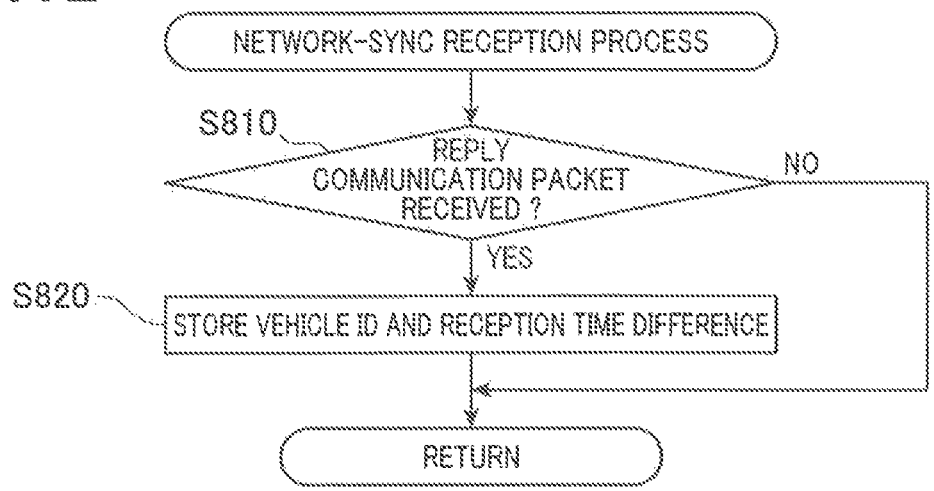
FIG. 12 is a flow chart showing a network-sync reception process, according to the fourth embodiment.

Referring now to FIG. 12, hereinafter is described a series of steps of the network-sync reception process performed by the control section 9. FIG. 12 shows the network-sync reception process. The network-sync reception process is repeatedly performed while the control section 9 is in operation.

When the network-sync reception process is executed, the control section 9 firstly determines, at step S810, whether or not a reply communication packet has been received from the unknown in-vehicle unit 1 from which the communication packet is determined as having been received at step S610. If no reply communication packet has been received (NO at step S810), the control section 9 halts the network-sync reception process until the next iteration.

On the other hand, if a reply communication packet has been received (YES at step S810), control proceeds to step S820. At step S820, the control section 9 extracts information that indicates a reception time (hereinafter referred to as "sync reception time") from the reception-time-reply data included in the received reply communication packet. The control section 9 also extracts, from the receiving database 41, a reception time of the communication packet which is determined as having been received at step S610 (hereinafter referred to as "direct reception time").

Then, the control section calculates a time difference between the extracted sync reception time and the direct reception time. After that, the control section 9 correlates the information indicating the time difference with the vehicle ID described in the header of the reply communication packet received at step S810, for storage in the receiving database 41. Then, the network-sync reception process is halted until the next iteration.

Figure 13:
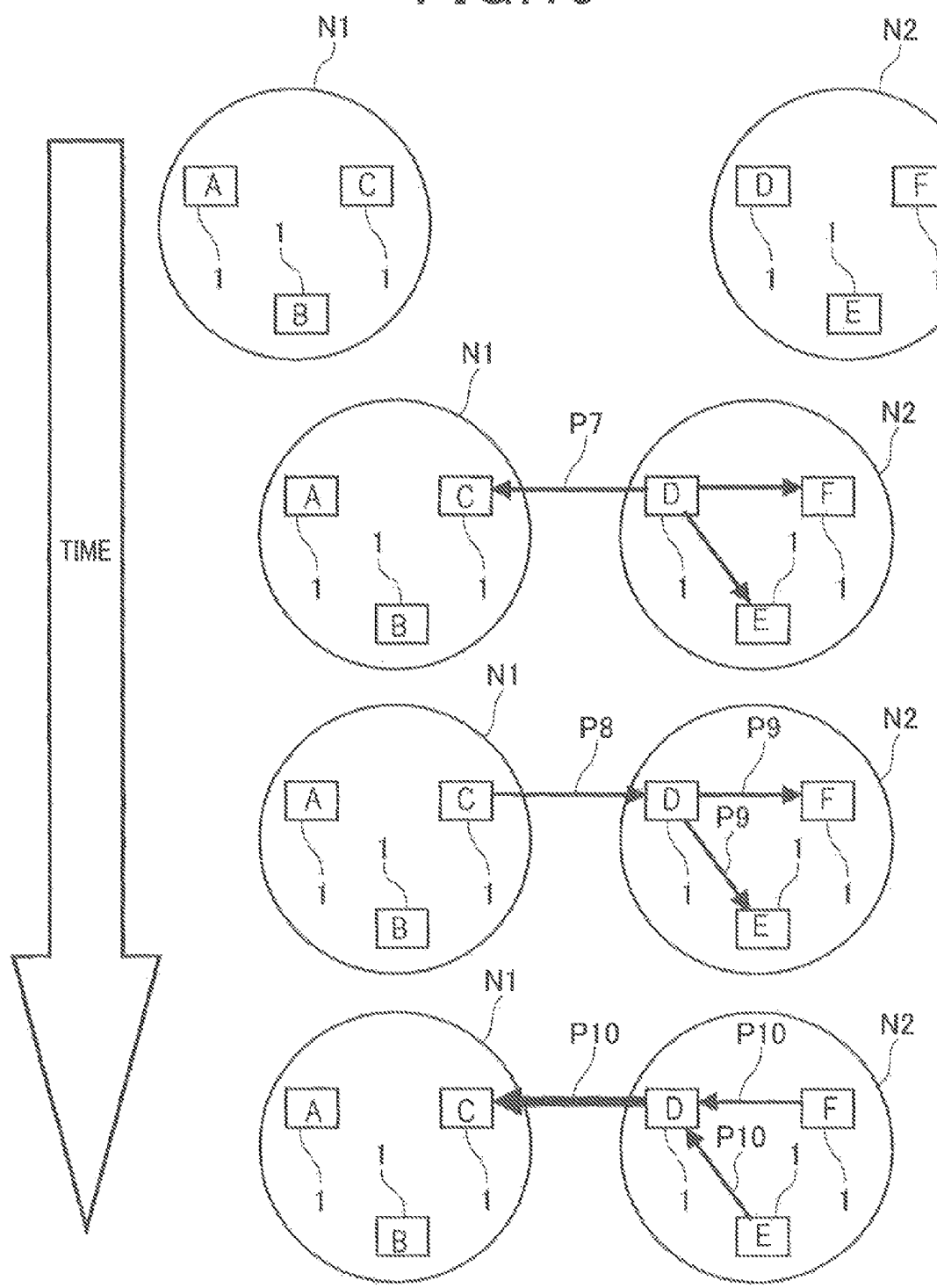
FIG. 13 is an explanatory diagram showing a process of synchronization, according to the fourth embodiment.

Referring to FIG. 13, hereinafter is described how a first network synchronizes with a second network, each being configured by a plurality of in-vehicle units 1.

FIG. 13 shows a process of synchronization. For example, as shown in FIG. 13, in a network N1, synchronization is established between in-vehicle units A, B and C. Also, in a network N2, synchronization is established between in-vehicle units D, E and F.

The networks N1 and N2 approach with each other, and then, the in-vehicle unit C of the network N1 receives a communication packet P7 from an unknown in-vehicle unit D. Upon reception of the communication packet P7, the in-vehicle unit C transmits a reception notification communication packet P8 to the in-vehicle unit D, the communication packet P8 including the transmission data ID of the communication packet P7.

Upon reception of the reception notification communication packet P8, the in-vehicle unit D transmits an inquiry communication packet P9 including the transmission data ID to the in-vehicle units E and F that configure the network N2.

Upon reception of the inquiry communication packet P9, each of the in-vehicle units E and F transmits a reply communication packet P10 to the in-vehicle unit D, the communication packet P10 including a reception time of the communication packet specified by the transmission data ID.

Upon reception of the reply communication packet P10, the in-vehicle unit D transfers the received reply communication packet P10 to the in-vehicle unit C of the network N1.

Thus, the in-vehicle unit C of the network N1 can acquire a difference between the time of its own reception of the communication packet P7, and the time of reception of the communication packet P7 by the in-vehicle unit E or F of the network N2. The timing of receiving the communication packet P7 is substantially the same between the in-vehicle unit C of the network N1 and the in-vehicle unit E or F of the network N2. Therefore, based on the time difference, the in-vehicle unit C of the network N1 can synchronize with the in-vehicle units E and F of the network 2.

In the wireless communication system 100 configured in this way, the in-vehicle unit 1 wirelessly transmits a communication packet, with the addition of a transmission data ID that is the identification information for identifying the data to be transmitted. Upon reception of a communication packet from a first in-vehicle unit 1 (YES at step S610), a fourth in-vehicle unit 1 transmits to the first in-vehicle unit 1 a reception notification communication packet that includes a transmission data ID of the received communication packet (steps S620 and S640).

Further, upon reception of the reception notification communication packet from the fourth in-vehicle unit 1 (YES at step S650), the first in-vehicle unit 1 transmits an inquiry communication packet to a second in-vehicle unit 1 (steps S660 and S680). The inquiry communication packet inquires the reception time at which the communication packet corresponding to the transmission data ID included in the reception notification communication packet has been received.

Upon reception of the inquiry communication packet from the first in-vehicle unit (YES at step S720), the second in-vehicle unit 2 transmits a reply communication packet to the first in-vehicle unit 1 (steps S730 and S750). The reply communication packet includes a reception time at which the communication packet corresponding to the transmission data ID has been received.

Upon reception of the reply communication packet from the second in-vehicle unit 1 (YES at step S690), the first in-vehicle unit 1 transmits the received reply communication packet to the fourth in-vehicle unit 1 (step S710).

Thus, after receiving a communication packet from the first in-vehicle unit 1, the fourth in-vehicle unit 1 transmits a reception notification communication packet to the first in-vehicle unit 1. In this way, the fourth in-vehicle unit 1 is able to acquire a reception time at which a different in-vehicle unit 1 (second in-vehicle unit 1), which has received the communication packet from the first in-vehicle unit 1, has received the communication packet.

Thus, when the first and second in-vehicle units 1 configure a network in which synchronization is established (sync-established network), the fourth in-vehicle unit 1 is able to acquire a time difference between its own clock and each of the clocks of the in-vehicle units 1 of the network. Accordingly, the fourth in-vehicle unit 1 can synchronize with the network.

In this way, the fourth in-vehicle unit 1 can transmit/receive a communication packet to/from a sync-established network from which data have not been received up to then. Thus, the fourth in-vehicle unit 1 can synchronize with the sync-established network, without the necessity of setting up a special device for transmitting synchronous signals.

(Fifth Embodiment)

Referring now to FIGS. 14 to 19, hereinafter is described a fifth embodiment of the present invention.

Figure 14:
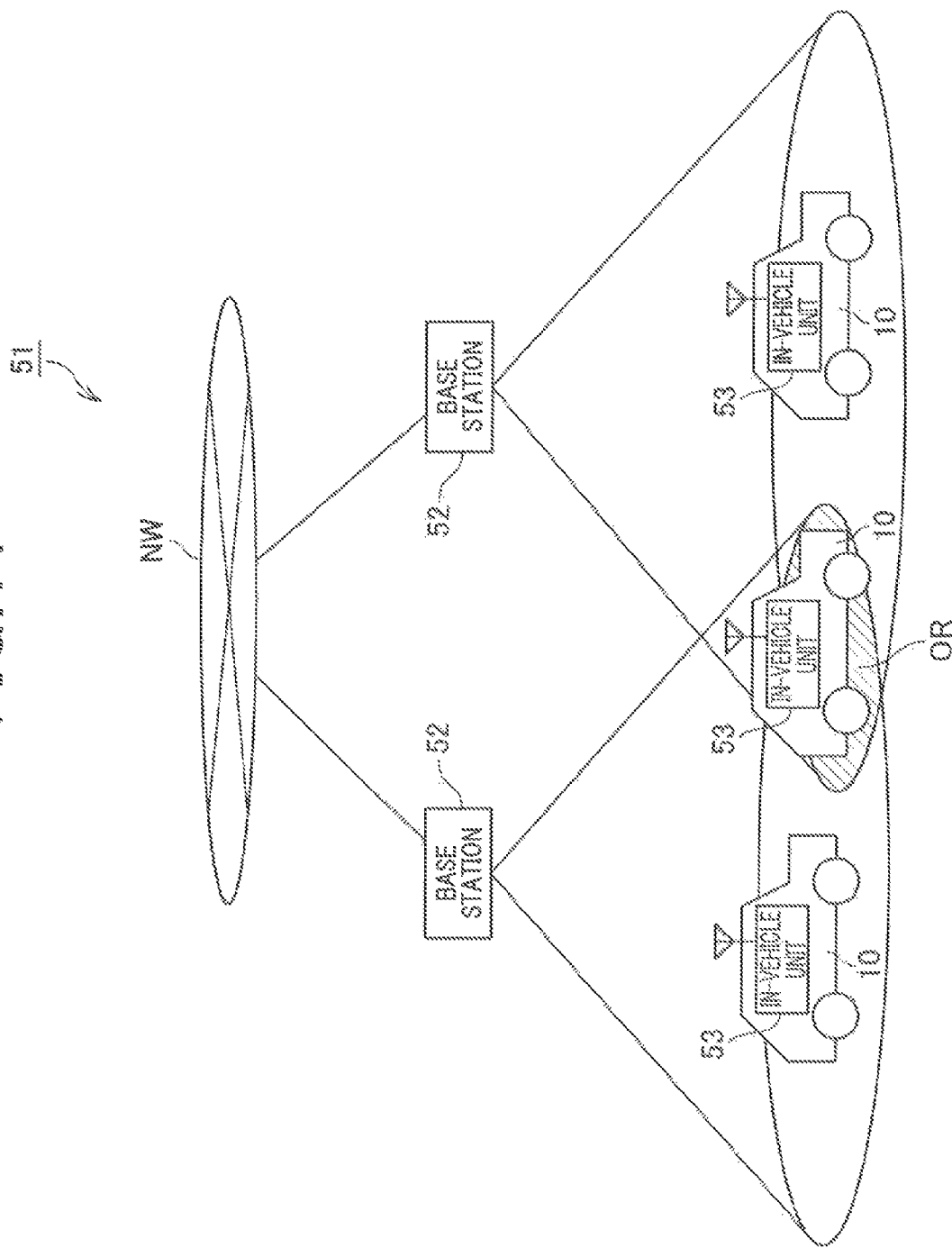
FIG. 14 is a block diagram showing a configuration of a wireless communication system, according to a fifth embodiment of the present invention.

FIG. 14 shows a configuration of a wireless communication system 51, according to the fifth embodiment. As shown in FIG. 14, the wireless communication system 51 is configured by a plurality of base stations 52 (FIG. 14 shows two base stations 52) that are set up being scattered in the vicinity of a vehicles' travel road, and a plurality of in-vehicle units 53 (FIG. 14 shows three in-vehicle units 53) that are installed in respective vehicles 10 to wirelessly communicate with the base stations 52 or different vehicles 10. The plurality of base stations 52 are configured to enable data communication with each other via a wide-area wireless communication network NW (e.g., mobile phone communication network).

Figure 15:
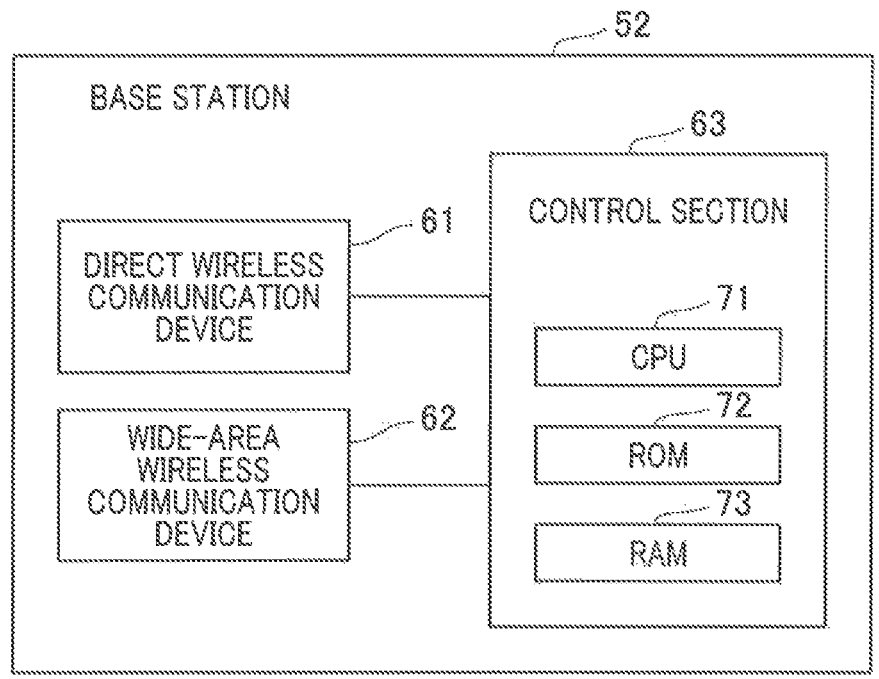
FIG. 15 is a block diagram showing a configuration of a base station, according to the fifth embodiment.

FIG. 15 shows a configuration of a base station 52. As shown in FIG. 15, each base station 52 includes a direct wireless communication device 61, a wide-area wireless communication device 62 and a control section 63.

Of these components, the direct wireless communication device 61 performs direct wireless communication with each in-vehicle unit 53. The wide-area wireless communication device 62 performs data communication with each base station 52 via the wide-area wireless communication network NW.

The control section 63 includes a CPU 71, a ROM 72 and a RAM 73. The control section 63 allows the CPU 71 to execute a process which is based on a program stored in the ROM 72 to thereby control the direct wireless communication device 61 and the wide-area wireless communication device 62.

Figure 16:
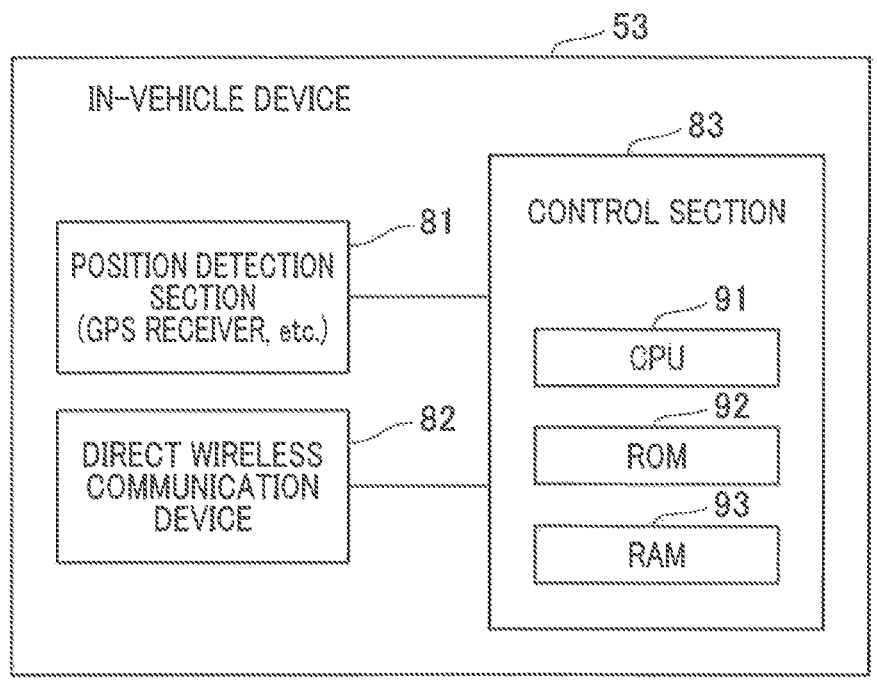
FIG. 16 is a block diagram showing an in-vehicle unit, according to the fifth embodiment.

FIG. 16 is a block diagram illustrating an in-vehicle unit 53. As shown in FIG. 16, each in-vehicle unit 53 includes a position detection section 81, a direct wireless communication device 82 and a control section 83.

The position detection section 81 includes a GPS receiver for receiving signals from a GPS satellite, and a plurality of sensors including a distance sensor that detects a travel distance of the own vehicle on the basis of the rotation of the wheels, and an azimuth sensor. The position detection section 81 detects the position and the running azimuth of the own vehicle on the basis of the signals obtained from these sensors. The detection result of the position detection section 81 is inputted to the control section 83.

The direct wireless communication device 82 performs direct wireless communication with each of the base stations 52 and each of the in-vehicle units 53.

The control section 83 includes a CPU 91, a ROM 92 and a RAM 93. The control section 83 allows the CPU 91 to execute a process which is based on a program stored in the ROM 92 to control the direct wireless communication device 82.

Each base station 52 has a function of transmitting a communication packet that stores various pieces of information, such as traffic information, to the surrounding vehicles 10. The communication packet transmitted from each base station 52 is provided with a base-station ID that is the identification information of the base station 52 concerned.

Each in-vehicle unit 53 has a function of transmitting a communication packet that stores information, such as the information regarding the conditions of the own vehicle, to a base station 52 or other vehicles 10. The communication packet transmitted from each in-vehicle unit 53 is transmitted upon reception of a transmission request from an in-vehicle control device (not shown) installed in each of the vehicles 10. Also, the communication packet transmitted from the in-vehicle unit 53 is provided with a vehicle ID that is the identification information of the in-vehicle unit 53 concerned.

The wireless communication system 51 configured as described above performs an overlapped-area data transmission process and an overlapped-area data reception process, which will be described later.

Figure 17:
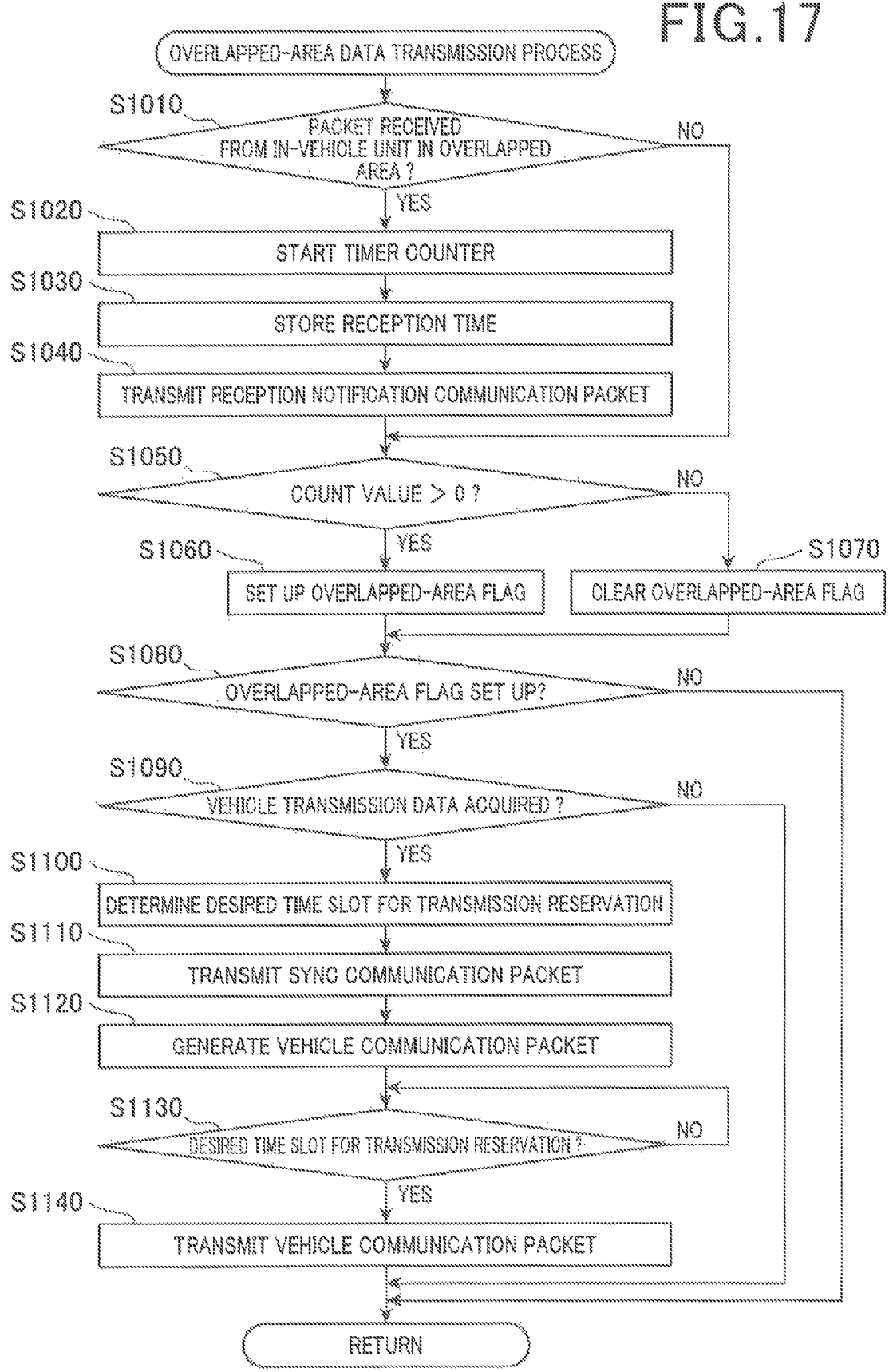
FIG. 17 is a flow chart showing an overlapped-area data transmission process, according to the fifth embodiment.

Referring first to FIG. 17, hereinafter is described a series of steps of the overlapped-area data transmission process performed by the control section 63 of each base station 52. FIG. 17 shows the overlapped-area data transmission process. The overlapped-area data transmission process is repeatedly performed while the control section 63 is in operation.

When the overlapped-area data transmission process is executed, the control section 63 firstly determines, at step S1010, whether or not any communication packet has been received from any in-vehicle unit 53 located in an overlapped area. In the overlapped area, an area used for the arrival of a communication packet from the base station 52 concerned overlaps with an area used for the arrival of a communication packet from any other base station 52 (see an area OR shown by hatching in FIG. 14). The communication packet transmitted from each in-vehicle unit 53 includes the information that indicates the current location of the in-vehicle unit 53.

If no communication packet is received from any in-vehicle unit 53 located in the overlapped area (NO at step S1010), the control section 63 transfers control to step S1050. On the other hand, if any communication packet has been received from an in-vehicle unit 53 locate in the overlapped area (YES at step S1010), control proceeds to step S1020 where the control section 63 starts a timer counter. For example, the timer counter automatically decrements a value in every 100 ms. When the time counter is started, the timer counter is ensured to start decrement from a preset positive integer value (e.g. a value equivalent to 60 seconds in the present embodiment) and stop decrementing when the value has reached zero.

Then, at step S1030, the control section 63 extracts a vehicle ID from the received communication packet, correlates the extracted vehicle ID to the reception time of the communication packet, and stores the correlated vehicle ID in the RAM 73.

Further, at step S1040, the control section 63 generates a communication packet that stores reception notification data. The reception notification data indicates the reception time at which the communication packet has been received from the in-vehicle unit 53 located in the overlapped area and the vehicle ID of this in-vehicle unit 53. Then, the control section 63 transmits the generated communication packet, via the wide-area wireless communication network NW, to another base station 52 which is capable of transmitting a communication packet to the overlapped area.

Hereinafter, the communication packet that stores the reception notification data is also referred to as a reception notification communication packet. After completing transmission of the reception notification communication packet, control proceeds to step S1050.

At step S1050, the control section 63 determines whether or not the value of the timer counter is larger than zero. If the value of the timer counter is larger than zero (YES at step S1050), the control section 63 sets up an overlapped-area flag at step S1060. Then, control proceeds to step S1080. On the other hand, if the value of the timer counter is zero (NO at step S1050), the control section 63 clears the overlapped—are flag at step S1070. Then, control proceeds to step S1080.

At step S1080, the control section 63 determines whether or not the overlapped-area flag has been set up. If the overlapped-area flag has been cleared (NO at step S1080), the control section 63 halts the overlapped-area data transmission process until the next iteration. On the other hand, if the overlapped-area flag has been set up (YES at step S1080), control proceeds to step S1090. At step S1090, the control section 63 determines whether or not vehicle transmission data to be transmitted to the in-vehicle unit 53 have been acquired from outside the base station 52 concerned.

If no vehicle transmission data have been acquired (NO at step S1090), the control section 63 halts the overlapped-area data transmission process until the next iteration. On the other hand, if vehicle transmission data have been acquired (YES at step S1090), control proceeds to step S1100. At step S1100, the control section 63 determines a desired time slot for transmission reservation for transmitting the vehicle transmission data.

The RAM 73 stores the reception time at which the communication packets have been received from the in-vehicle units 53 located in the overlapped area (see step S1030), reception times stored in the reception notification communication packets received from other base stations 52 (see step S1240), and information for specifying the desired time slots for transmission reservation of other base stations 52 (see step S1220).

At step S1100, the control section 63 uses these pieces of information to determine its own desired time slot for transmission reservation so as not to coincide with the desired time slots for transmission reservation of other base stations 52. The method of determining the desired time slot for transmission reservation will be described later.

At step S110, the control section 63 generates a sync communication packet and transmits the generated sync communication packet, via the wide-area wireless communication network NW, to another base station 52 which is capable of transmitting a communication packet to an overlapped area. The generated sync communication packet stores the time slot information that indicates the desired time slot for transmission reservation determined at step S1100.

Then, at step S120, the control section 63 generates a communication packet that stores the vehicle transmission data acquired at step S1090. Hereinafter, the communication packet that stores vehicle transmission data is also referred to as a vehicle communication packet.

At step S1130, the control section 63 determines whether or not the start time has come of the desired time slot for transmission reservation determined at step S1100. If the start time of the desired time slot for transmission reservation has not yet come (NO at step S1130), the control section 63 repeats the processing of step S1130 to wait until the start time of the desired time slot for transmission reservation comes.

On the other hand, if the start time of the desired time slot for transmission reservation has come (YES at step S1130), control proceeds to step S1140. At step S1140, the control section 63 transmits the vehicle communication packet generated at step S1120 to the vehicles 10 located around the own base station and in the communication area, via the direct wireless communication device 61. Then, the overlapped-area data transmission process is halted until the next iteration.

Figure 18:
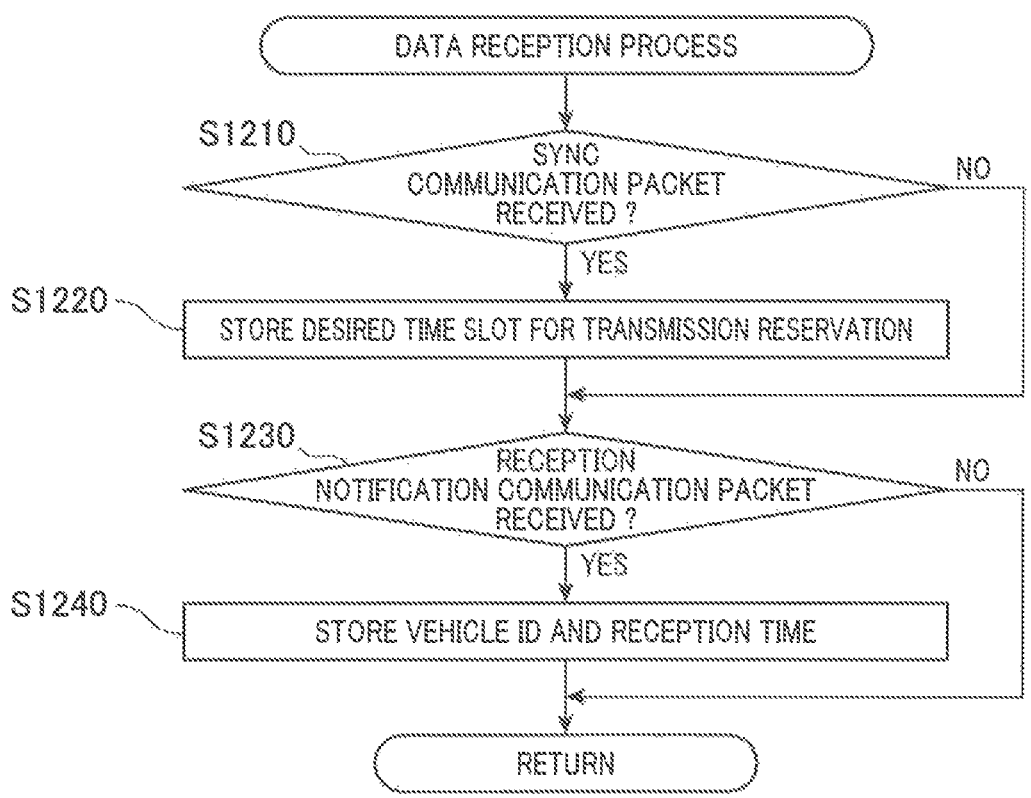
FIG. 18 is a flow chart showing an overlapped-area data reception process, according to the fifth embodiment.

Referring now to FIG. 18, hereinafter is described a series of the overlapped-area data reception process performed by the control section 63 of each base station 52. FIG. 18 shows the overlapped-area data reception process. The overlapped-area data reception process is repeatedly performed while the control section 63 is in operation.

When the overlapped-area data reception process is executed, the control section 63 firstly determines, at step S1210, whether or not any sync communication packet has been received from any other base station 52. If no sync communication packet has been received (NO at step S1210), the control section transfers control to step S1230. On the other hand, if any sync communication packet has been received (YES at step S1210), the control section 63 stores, in the RAM 73, the time slot information stored in the received sync communication packet. Then, control proceeds to step S1230.

At step S1230, the control section 63 determines whether or not any reception notification communication packet has been received from any other base station 52. If no reception notification communication packet has been received (NO at step S1230), the control section 63 halts the overlapped-area data reception process until the next iteration. On the other hand, if any reception notification communication packet has been received (YES at step S1230), control proceeds to step S1240.

At step S1240, the control section 63 correlates the reception time stored in the received reception notification communication packet, with the vehicle ID given to the received reception notification communication packet, and stores the correlated vehicle ID in the RAM 73. Then, the overlapped-area data reception process is halted until the next iteration.

Hereinafter is specifically described the method of determining the time slot at step S1100.

As described above, the RAM 73 stores the reception times at which communication packets have been received from the in-vehicle units 53 located in the overlapped area (hereinafter referred to as "direct reception times"), the reception times of reception notification communication packets received from other base stations 52 (hereinafter referred to as sync reception times), and the time slot information of other base stations 52.

Thus, at step S1100, the control section 63 firstly selects latest reception times correlated to the same vehicle ID, one from among the direct reception times and one from among the sync reception times stored in the RAM 73. Then, the control section 63 calculates the time difference between the selected reception times and puts backward or forward the desired time slots for transmission reservation indicated by the time slot information, by the time corresponding to the time difference to thereby correct the desired time slots for transmission reservation of other base stations 52.

The control section 63 corrects all the desired time slots for transmission reservation that occur on or after the present time point, the time slots being indicated by the time slot information stored in the RAM 73. Then, the control section 63 determines its own desired time slot for transmission reservation so as not to coincide with the corrected desired time slots for transmission reservation.

Figure 19:
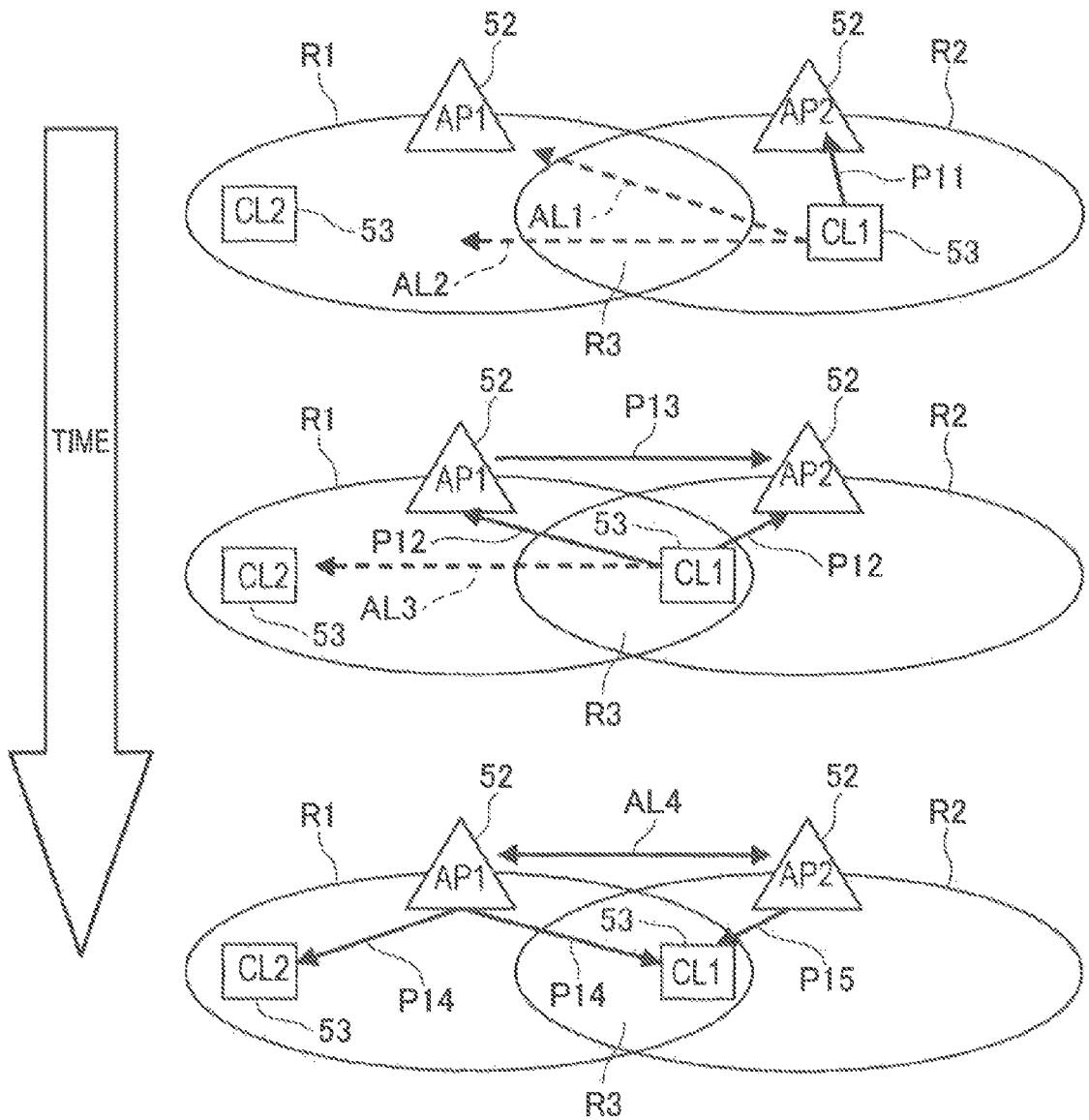
FIG. 19 is an explanatory diagram showing a process of adjusting transmission timing, according to the fifth embodiment.

Referring to FIG. 19, hereinafter is described how transmission timing is adjusted between a first base station and a second base station which have a partial overlap between their data transmission enabled areas. FIG. 19 shows a process of adjusting transmission timing. For example, as shown in FIG. 19, a base station AP1 has a data transmission enabled area R1 and a base station AP2 has a data transmission enabled area R2, with the areas R1 and R2 being partially overlapped with each other (see an overlapped area R3). Further, an in-vehicle unit CL2 is located in the data transmission enabled area R1, while an in-vehicle unit CL1 is located in the data transmission enabled area R2.

The in-vehicle unit CL1, when it is located outside the overlapped area R3 but within the data transmission enabled area R2 of the base station AP2, can transmit a communication packet P11 to the base station AP2. However, the in-vehicle unit CL1 is not able to transmit the communication packet P11 to the base station AP1 and the in-vehicle unit CL2 (see the arrows AL1 and AL2).

After that, moving into the overlapped area R3, the in-vehicle unit CL1 is able to transmit a communication packet P12 not only to the base station AP2 but also to the base station AP1. However, the in-vehicle unit CL1 is not able to transmit the communication packet P12 to the in-vehicle unit CL2 (see the arrow AL3).

The base station AP1 that has received the communication packet P12 from the in-vehicle unit CL1 transmits a reception notification communication packet P13 that stores reception notification data to the base station AP2. The reception notification data indicate the reception time at which the communication packet P12 has been received from the in-vehicle unit CL1, and the vehicle ID of the in-vehicle unit CL1.

Thus, the base station AP2 is able to acquire the difference between the time when the communication packet P12 has been received by itself and the time when the communication packet P12 has been received by the base station AP1. The timing of receiving the packet P12 is substantially the same between the base stations AP1 and AP2.

Accordingly, the base stations AP1 and AP2 are able to mutually adjust their transmission time slots, so that the time slot in which the base station AP1 transmits a communication packet P14 to the in-vehicle unit CL1 located in the overlapped area R3 will not coincide with the time slot in which the base station AP2 transmits a communication packet P15 to the in-vehicle unit CL1 located in the overlapped area R3 (see the arrow AL4).

In the wireless communication system 51 configured as described above, the data transmission enabled area of a base station 52 partially overlaps with the data transmission enabled area of a base station 52 different from the base station 52 concerned (hereinafter referred to as "different base station").

Upon wirelessly receiving a communication packet from an in-vehicle unit 53 located in the overlapped area, the base station 52 concerned transmits a reception notification communication packet to the different base station. In the reception notification communication packet, reception time information that indicates the reception time of wirelessly receiving the communication packet from the in-vehicle unit 53 is correlated to the vehicle ID for identifying this in-vehicle unit 53 (step S1040).

Thus, when the reception notification communication packet is received, the base station 52 can acquire the difference between the time when the communication packet has been received from the in-vehicle unit 53 located in the overlapped area and the time when the different base station has received the communication packet from the in-vehicle unit 53 located in the overlapped area.

The timing of receiving the communication packet from the in-vehicle unit 53 located in the overlapped area is substantially the same between the base station 52 and the different base station. Thus, the base station 52 that has received the reception notification communication packet can acquire the difference between the time of the clock of itself and the time of the clock of the different base station. As a result, the base station 52 can synchronize with the different base station.

In this way, the base station 52 and the different base station 52 can synchronize with each other by transmitting/receiving the reception notification communication packet therebetween, without the necessity of setting up a special device for transmitting synchronous signals.

Some embodiments of the present invention have been described so far. However, the present invention is not limited to the embodiments described above but may be implemented in various modifications as far as the modifications fall within the technical scope of the present invention.

For example, the first embodiment has a configuration in which the reception time of a vehicle-data communication packet already received from a different in-vehicle unit 1 is used for generating a sync communication packet.

As an alternative to this, for example, before transmitting a sync communication packet, a request communication packet may be transmitted to the transmission-source in-vehicle unit to request wireless transmission of a communication packet. Then, after wirelessly receiving a communication packet from the transmission-source in-vehicle unit, a sync communication packet may be transmitted, which includes reception time information indicating a reception time at which the communication packet has been wirelessly received from the transmission-source in-vehicle unit.

Specifically, as shown in FIG. 20, a sync-data transmission process may be performed. FIG. 20 shows the sync-data transmission process. As shown in FIG. 20, if the sync-data transmission conditions are met at step S110 (YES at step S110), the control section 9 may generate a request communication packet at step S112 to request other in-vehicle units 1 to transmit their vehicle-data communication packets.

Then, at step S114, the control section 9 may perform carrier sense through the communication section 7 to determine whether or not other in-vehicle units 1 are communicating. The carrier sense is similar to the carrier sense based on the well-known CSMA. If other in-vehicle units 1 are communicating (YES at step S114), the control section 9 may repeat the processing of step S114 to wait until other in-vehicle units 1 stop communication.

On the other hand, if other in-vehicle units 1 are not communicating (NO at step S114), the control section 9 may transmit, at step S116, the request communication packet generated at step S112 to the vehicles 10 located around the own vehicle and in the communication area, through the communication section 7.

After that, at step S118, the control section 9 may determine whether or not any communication packet has been received from other in-vehicle units 1. If no communication packet has been received (NO at step S118), the control section 9 may repeat the processing of step S118 to wait until a communication packet is received.

On the other hand, if any communication packet has been received (YES at step S118), the control section 9 may generate, at step S122, a sync communication packet that stores sync data. The sync data in this case include the reception time of the communication packet that has been determined to be received at step S118, and the corresponding vehicle ID.

After that, at step S130, the control unit 9 may wait until other in-vehicle units 1 stop communication. Then, if other in-vehicle units 1 are not communicating (NO at step S130), the control unit 9 may transmit, at step S142, the sync communication packet generated at step S122 to the vehicles 10 located around the own vehicle and in the communication area, through the communication section 7. Then, the sync-data transmission process may be halted until the next iteration.

This process described above can reduce the difference between the reception time stored in the sync communication packet and the time when the sync communication packet is transmitted. Thus, the in-vehicle unit 1 concerned is able to synchronize with other in-vehicle units 1 on the basis of the reception time which is the latest to the utmost extent.

In the first embodiment described above, the reception time information that indicates the first reception time corresponds to the information that indicates a reception time at which the in-vehicle unit 1 concerned has received a communication packet from a transmission-source in-vehicle unit.

However, in the first embodiment, a transmission time may be determined in advance, unlike the CSMA by which the timing of transmitting a communication packet is randomly set. In this case, the timing of transmitting a communication packet is substantially the same as the timing of receiving the communication packet.

Accordingly, the reception time information that indicates the first reception time corresponds to the information that indicates a transmission time at which the in-vehicle unit 1 concerned transmits a sync communication packet. Thus, in-vehicle unit 1 may transmit a sync communication packet that stores sync data including the transmission time and the vehicle ID of the in-vehicle unit 1 concerned as a vehicle ID corresponding to the transmission time.

What is claimed is:

1. A wireless communication system, comprising:
   a plurality of wireless communication units that wirelessly transmit and receive data,
   the plurality of wireless communication units including a first, second and third wireless communication units,
   the first wireless communication unit being configured to:
      receive first data including identification information associated with the first data transmitted from the third wireless communication unit;
      generate, when the first wireless communication unit needs to share a specific time with the second wireless communication unit, second data associated with a first reception time of the received first data; and
      transmit the identification information included in the received first data and the second data associated with the first reception time of the first data,
   the second wireless communication unit being configured to:
      receive the first data including the identification information transmitted from the third wireless communication unit;
      receive the identification information and the second data transmitted from the first wireless communication unit; and
      calculate, upon reception of the identification information and the second data transmitted from the first wireless communication unit, if it is judged that the first data has previously been received at the second wireless communication unit based on the identification information, a time value needed to synchronize with the first wireless communication unit, based on a second reception time of the first data previously received at the second wireless communication unit and the first reception time of the first data associated with the second data transmitted from the first wireless communication unit,
   wherein:
   the first wireless communication unit is further configured to transmit the second data including an elapsed time from a first reception time, at which the first data transmitted from the third wireless communication unit is received, to the specific time;
   the second wireless communication unit is further configured to calculate, as the time value needed to synchronize with the first wireless communication unit, a value of the specific time in a time reference of the second wireless communication unit, by adding a second reception time of the first data previously received at the second wireless communication unit to the elapsed time included in the second data transmitted from the first wireless communication unit; and
   the first wireless communication unit is further configured to transmit the second data including a time difference between a first reception time, at which the first data transmitted from the third wireless communication unit was received, and a third reception time at which the first data transmitted from an other wireless communication unit other than the third wireless communication unit was received, the second data being associated with identification information for identifying the other wireless communication unit.

2. The wireless communication system according to claim 1, wherein:
   the plurality of wireless communication units further includes a fifth wireless communication unit and a sixth wireless communication unit;
   the first wireless communication unit and the fifth wireless communication unit have a partial overlapped area between their data transmission enabled areas; and the first wireless communication unit is further configured to transmit, upon reception of the first data transmitted from the sixth wireless communication unit positioned in the overlapped area, the second data to the fifth wireless communication unit, the second data including a reception time of the first data transmitted from the six wireless communication unit and being associated with transmission source identification information for identifying the sixth wireless communication unit.

3. The wireless communication system according to claim 1, wherein:
the first wireless communication unit is further configured to:
transmit, when the first wireless communication unit is needed to share the specific time with the second wireless communication unit, request data for requesting the third wireless communication unit to wirelessly transmit the first data; and
transmit, after the first data transmitted from the third wireless communication unit is received, the identification information and the second data.

4. The wireless communication system according to claim 1, wherein:
the specific time is a time indicating a reserved time slot for data transmission of the first wireless communication unit.

5. A wireless communication system, comprising:
a plurality of wireless communication units that wirelessly transmit and receive data,
the plurality of wireless communication units including a first, second and third wireless communication units,
the first wireless communication unit being configured to:
receive first data including identification information associated with the first data transmitted from the third wireless communication unit;
generate, when the first wireless communication unit needs to share a specific time with the second wireless communication unit, second data associated with a first reception time of the received first data; and
transmit the identification information included in the received first data and the second data associated with the first reception time of the first data,
the second wireless communication unit being configured to:
receive the first data including the identification information transmitted from the third wireless communication unit;
receive the identification information and the second data transmitted from the first wireless communication unit; and
calculate, upon reception of the identification information and the second data transmitted from the first wireless communication unit, if it is judged that the first data has previously been received at the second wireless communication unit based on the identification information, a time value needed to synchronize with the first wireless communication unit, based on a second reception time of the first data previously received at the second wireless communication unit and the first reception time of the first data associated with the second data transmitted from the first wireless communication unit,
wherein:
the first wireless communication unit is further configured to transmit the second data including an elapsed time from a first reception time, at which the first data transmitted from the third wireless communication unit is received, to the specific time;
the second wireless communication unit is further configured to calculate, as the time value needed to synchronize with the first wireless communication unit, a value of the specific time in a time reference of the second wireless communication unit, by adding a second reception time of the first data previously received at the second wireless communication unit to the elapsed time included in the second data transmitted from the first wireless communication unit;
the plurality of wireless communication units further includes a fourth wireless communication unit;
the fourth wireless communication unit is configured to transmit, upon reception of transmission data transmitted from the first wireless communication unit, reception notification data to the first wireless communication unit, the reception notification data including the data identification of the received data to the first wireless communication unit;
the first wireless communication unit is configured to:
transmit transmission data provided with data identification information for identifying the transmission data;
transmit, upon reception of the reception notification data transmitted from the fourth wireless communication unit, inquiry data for inquiring of the second wireless communication unit about a reception time of the transmission data associated with the data identification information included in the reception notification data;
transmit, upon reception of reply data transmitted from the second wireless communication unit, report data to the fourth wireless communication unit, the report data including the reception time of the transmission data associated with the data identification information included in the reply data; and
the second wireless communication unit is further configured to transmit, upon reception of the inquiry data transmitted from the first wireless communication unit, the reply data to the first wireless communication unit, the reply data including the reception time of the transmission data associated with the data identification information.

6. A wireless communication system, comprising:
a plurality of wireless communication units that wirelessly transmit and receive data,
the plurality of wireless communication units including a first, second and third wireless communication units,
the first wireless communication unit being configured to:
receive first data including identification information associated with the first data transmitted from the third wireless communication unit;
generate, when the first wireless communication unit needs to share a specific time with the second wireless communication unit, second data associated with a first reception time of the received first data; and
transmit the identification information included in the received first data and the second data associated with the first reception time of the first data,
the second wireless communication unit being configured to:
receive the first data including the identification information transmitted from the third wireless communication unit;

receive the identification information and the second data transmitted from the first wireless communication unit; and calculate, upon reception of the identification information and the second data transmitted from the first wireless communication unit, if it is judged that the first data has previously been received at the second wireless communication unit based on the identification information, a time value needed to synchronize with the first wireless communication unit, based on a second reception time of the first data previously received at the second wireless communication unit and the first reception time of the first data associated with the second data transmitted from the first wireless communication unit, wherein:

the first wireless communication unit is further configured to transmit the second data including a first reception time at which the first data transmitted from the third communication unit was received;

the second wireless communication unit is further configured to calculate, as the time value needed to synchronize with the first wireless communication unit, a time difference between a time reference of the first wireless communication unit and a time reference of the second wireless communication unit, by comparing a second reception time of the first data previously received at the second wireless communication unit with the first reception time included in the second data transmitted from the first wireless communication unit;

the first wireless communication unit is further configured to transmit the second data including a time difference between a first reception time, at which the first data transmitted from the third wireless communication unit was received, and a third reception time at which the first data transmitted from an other wireless communication unit other than the third wireless communication unit was received, the second data being associated with identification information for identifying the other wireless communication unit.

7. The wireless communication system according to claim 6, wherein:

the plurality of wireless communication units further includes a fifth wireless communication unit and a sixth wireless communication unit;

the first wireless communication unit and the fifth wireless communication unit have a partial overlapped area between their data transmission enabled areas; and the first wireless communication unit is further configured to transmit, upon reception of the first data transmitted from the sixth wireless communication unit positioned in the overlapped area, the second data to the fifth wireless communication unit, the second data including a reception time of the first data transmitted from the six wireless communication unit and being associated with transmission source identification information for identifying the sixth wireless communication unit.

8. The wireless communication system according to claim 6, wherein:

the first wireless communication unit is further configured to:

transmit, when the first wireless communication unit is needed to share the specific time with the second wireless communication unit, request data for requesting the third wireless communication unit to wirelessly transmit the first data; and transmit, after the first data transmitted from the third wireless communication unit is received, the identification information and the second data.

9. A wireless communication system, comprising:

a plurality of wireless communication units that wirelessly transmit and receive data, the plurality of wireless communication units including a first, second and third wireless communication units, the first wireless communication unit being configured to:

receive first data including identification information associated with the first data transmitted from the third wireless communication unit;

generate, when the first wireless communication unit needs to share a specific time with the second wireless communication unit, second data associated with a first reception time of the received first data; and transmit the identification information included in the received first data and the second data associated with the first reception time of the first data, the second wireless communication unit being configured to:

receive the first data including the identification information transmitted from the third wireless communication unit;

receive the identification information and the second data transmitted from the first wireless communication unit; and calculate, upon reception of the identification information and the second data transmitted from the first wireless communication unit, if it is judged that the first data has previously been received at the second wireless communication unit based on the identification information, a time value needed to synchronize with the first wireless communication unit, based on a second reception time of the first data previously received at the second wireless communication unit and the first reception time of the first data associated with the second data transmitted from the first wireless communication unit, wherein:

the first wireless communication unit is further configured to transmit the second data including a first reception time at which the first data transmitted from the third communication unit was received;

the second wireless communication unit is further configured to calculate, as the time value needed to synchronize with the first wireless communication unit, a time difference between a time reference of the first wireless communication unit and a time reference of the second wireless communication unit, by comparing a second reception time of the first data previously received at the second wireless communication unit with the first reception time included in the second data transmitted from the first wireless communication unit;

the plurality of wireless communication units further includes a fourth wireless communication unit;

the fourth wireless communication unit is configured to transmit, upon reception of transmission data transmitted from the first wireless communication unit, reception notification data to the first wireless communication unit, the reception notification data including the data identification of the received data to the first wireless communication unit;

the first wireless communication unit is further configured to:

transmit transmission data provided with data identification information for identifying the transmission data;

transmit, upon reception of the reception notification data transmitted from the fourth wireless communication unit, inquiry data for inquiring of the second wireless communication unit about a reception time of the transmission data associated with the data identification information included in the reception notification data;

transmit, upon reception of reply data transmitted from the second wireless communication unit, report data to the fourth wireless communication unit, the report data including the reception time of the transmission data associated with the data identification information included in the reply data; and the second wireless communication unit is further configured to transmit, upon reception of the inquiry data transmitted from the first wireless communication unit, the reply data to the first wireless communication unit, the reply data including the reception time of the transmission data associated with the data identification information.

10. A wireless communication system, comprising:
a plurality of wireless communication units that wirelessly transmit and receive data,
the plurality of wireless communication units including a first, second and third wireless communication units,
the first wireless communication unit being configured to:
receive first data including identification information associated with the first data transmitted from the third wireless communication unit;
generate, when the first wireless communication unit needs to share a specific time with the second wireless communication unit, second data associated with a first reception time of the received first data; and
transmit the identification information included in the received first data and the second data associated with the first reception time of the first data,
the second wireless communication unit being configured to:
receive the first data including the identification information transmitted from the third wireless communication unit;
receive the identification information and the second data transmitted from the first wireless communication unit; and
calculate, upon reception of the identification information and the second data transmitted from the first wireless communication unit, if it is judged that the first data has previously been received at the second wireless communication unit based on the identification information, a time value needed to synchronize with the first wireless communication unit, based on a second reception time of the first data previously received at the second wireless communication unit and the first reception time of the first data associated with the second data transmitted from the first wireless communication unit, wherein:
the first wireless communication unit is further configured to transmit the second data including a time difference between a first reception time, at which the first data transmitted from the third wireless communication unit was received, and a third reception time at which the first data transmitted from an other wireless communication unit other than the third wireless communication unit was received, the second data being associated with identification information for identifying the other wireless communication unit.

11. The wireless communication system according to claim 10, wherein:
the plurality of wireless communication units further includes a fifth wireless communication unit and a sixth wireless communication unit;
the first wireless communication unit and the fifth wireless communication unit have a partial overlapped area between their data transmission enabled areas; and
the first wireless communication unit is further configured to transmit, upon reception of the first data transmitted from the sixth wireless communication unit positioned in the overlapped area, the second data to the fifth wireless communication unit, the second data including a reception time of the first data transmitted from the six wireless communication unit and being associated with transmission source identification information for identifying the sixth wireless communication unit.

12. The wireless communication system according to claim 10, wherein:
the first wireless communication unit is further configured to:
transmit, when the first wireless communication unit is needed to share the specific time with the second wireless communication unit, request data for requesting the third wireless communication unit to wirelessly transmit the first data; and
transmit, after the first data transmitted from the third wireless communication unit is received, the identification information and the second data.

13. A wireless communication system, comprising:
a plurality of wireless communication units that wirelessly transmit and receive data,
the plurality of wireless communication units including a first, second and third wireless communication units,
the first wireless communication unit being configured to:
receive first data including identification information associated with the first data transmitted from the third wireless communication unit;
generate, when the first wireless communication unit needs to share a specific time with the second wireless communication unit, second data associated with a first reception time of the received first data; and
transmit the identification information included in the received first data and the second data associated with the first reception time of the first data,
the second wireless communication unit being configured to:
receive the first data including the identification information transmitted from the third wireless communication unit;
receive the identification information and the second data transmitted from the first wireless communication unit; and
calculate, upon reception of the identification information and the second data transmitted from the first wireless communication unit, if it is judged that the first data has previously been received at the second wireless communication unit based on the identification information, a time value needed to synchronize with the first wireless communication unit, based on a second reception time of the first data previously received at the second wireless communication unit and the first reception time of the first data associated with the second data transmitted from the first wireless communication unit, wherein:

the plurality of wireless communication units further includes a fourth wireless communication unit;

the fourth wireless communication unit is configured to transmit, upon reception of transmission data transmitted from the first wireless communication unit, reception notification data to the first wireless communication unit, the reception notification data including the data identification of the received data to the first wireless communication unit;

the first wireless communication unit is further configured to:

transmit transmission data provided with data identification information for identifying the transmission data;

transmit, upon reception of the reception notification data transmitted from the fourth wireless communication unit, inquiry data for inquiring of the second wireless communication unit about a reception time of the transmission data associated with the data identification information included in the reception notification data;

transmit, upon reception of reply data transmitted from the second wireless communication unit, report data to the fourth wireless communication unit, the report data including the reception time of the transmission data associated with the data identification information included in the reply data; and the second wireless communication unit is further configured to transmit, upon reception of the inquiry data transmitted from the first wireless communication unit, the reply data to the first wireless communication unit, the reply data including the reception time of the transmission data associated with the data identification information.

14. The wireless communication system according to claim 13, wherein:

the plurality of wireless communication units further includes a fifth wireless communication unit and a sixth wireless communication unit;

the first wireless communication unit and the fifth wireless communication unit have a partial overlapped area between their data transmission enabled areas; and the first wireless communication unit is further configured to transmit, upon reception of the first data transmitted from the sixth wireless communication unit positioned in the overlapped area, the second data to the fifth wireless communication unit, the second data including a reception time of the first data transmitted from the six wireless communication unit and being associated with transmission source identification information for identifying the sixth wireless communication unit.

15. The wireless communication system according to claim 13, wherein:

the first wireless communication unit is further configured to:

transmit, when the first wireless communication unit is needed to share the specific time with the second wireless communication unit, request data for requesting the third wireless communication unit to wirelessly transmit the first data; and transmit, after the first data transmitted from the third wireless communication unit is received, the identification information and the second data.

16. A communication method for a wireless communication system comprising a plurality of wireless communication units that wirelessly transmit and receive data, the plurality of wireless communication units including a first, second and third wireless communication units, the method comprising:

at the first wireless communication unit, receiving first data including identification information transmitted from the third wireless communication unit;

generating, when the first wireless communication unit needs to share a specific time with the second wireless communication unit, second data associated with a first reception time of the received first data;

transmitting the identification information included in the received first data and the second data associated with the first reception time of the first data; and transmitting the second data including a time difference between a first reception time, at which the first data transmitted from the third wireless communication unit was received, and a third reception time at which the first data transmitted from an other wireless communication unit other than the third wireless communication unit was received, the second data being associated with identification information for identifying the other wireless communication unit, at the second wireless communication unit, receiving the first data including the identification information transmitted from the third wireless communication unit;

receiving the identification information and the second data transmitted from the first wireless communication unit; and calculating, upon reception of the identification information and the second data transmitted from the first wireless communication unit, if it is judged that the first data has previously been received based on the identification information, a time value needed to synchronize with the first wireless communication unit, based on a second reception time of the first data previously received at the second wireless communication unit and the first reception time of the first data associated with the second data transmitted from the first wireless communication unit.

* * * * *